US006477507B2

(12) United States Patent
Sugimori

(10) Patent No.: US 6,477,507 B2
(45) Date of Patent: Nov. 5, 2002

(54) ONLINE COMMODITY MANAGEMENT, A SERVER SYSTEM APPLIED IN THE ONLINE COMMODITY MANAGEMENT SYSTEM, TERMINAL EQUIPMENT APPLIED IN THE ONLINE COMMODITY MANAGEMENT SYSTEM, A MANAGING METHOD IN THE ONLINE COMMODITY MANAGEMENT SYSTEM, AND A COMPUTER-READABLE RECORDING MEDIUM WITH A PROGRAM MAKING A COMPUTER EXECUTE THE METHOD RECORDED THEREIN

(75) Inventor: Shinji Sugimori, Chiba (JP)

(73) Assignee: Justsystem Corp., Tokushima (JP)

( * ) Notice: Subject to any disclaimer, the term of this patent is extended or adjusted under 35 U.S.C. 154(b) by 0 days.

(21) Appl. No.: 09/016,783

(22) Filed: Jan. 30, 1998

(65) Prior Publication Data

US 2002/0046174 A1 Apr. 18, 2002

(30) Foreign Application Priority Data

Nov. 13, 1997 (JP) .............................................. 9-312378

(51) Int. Cl.$^7$ .............................................. G06F 17/60
(52) U.S. Cl. ............................... 705/26; 705/1; 705/27; 705/30
(58) Field of Search ............................... 705/1, 26, 27, 705/30; 700/237

(56) References Cited

U.S. PATENT DOCUMENTS

| | | | | | |
|---|---|---|---|---|---|
| 4,870,576 A | * | 9/1989 | Tornetta | ........................ | 705/1 |
| 5,707,289 A | * | 1/1998 | Watanabe et al. | ............. | 463/40 |
| 5,855,007 A | * | 12/1998 | Jovicic et al. | ................. | 705/14 |
| 5,875,430 A | * | 2/1999 | Koether | .......................... | 705/1 |
| 5,903,878 A | * | 5/1999 | Talati et al. | ................... | 705/26 |
| 5,909,671 A | * | 6/1999 | Byford et al. | ................ | 705/26 |
| 5,931,901 A | * | 8/1999 | Wolfe et al. | ................ | 709/206 |
| 5,940,806 A | * | 8/1999 | Danial | ......................... | 705/26 |
| 5,940,807 A | * | 8/1999 | Purcell | ........................ | 705/26 |
| 5,960,411 A | * | 9/1999 | Hartman et al. | .............. | 705/26 |
| 6,023,683 A | * | 2/2000 | Johnson et al. | ............... | 705/26 |
| 6,029,142 A | * | 2/2000 | Hill | ............................. | 705/27 |

FOREIGN PATENT DOCUMENTS

| | | |
|---|---|---|
| JP | 5-165856 | 7/1993 |
| JP | 06-244993 | 9/1994 |
| JP | 6-266731 | 9/1994 |
| JP | 07028722 | 1/1995 |
| JP | 07225725 | 8/1995 |
| JP | 08-111611 | 4/1996 |
| JP | 08147365 | 6/1996 |
| JP | 08214281 | 8/1996 |
| JP | 08249387 | 9/1996 |
| JP | 8-249387 | 9/1996 |
| JP | 08263549 | 10/1996 |
| JP | 08335240 | 12/1996 |
| JP | 9-6849 | 1/1997 |
| JP | 3035622 | 1/1997 |
| JP | 9-231264 | 9/1997 |
| JP | 9-244886 | 9/1997 |

OTHER PUBLICATIONS

Paritial English Translation of Office Action.
Ichitaro 7 for Windows 95, "JUSTSYSTEM Corp.", (1996).

* cited by examiner

*Primary Examiner*—Eric W. Stamber
*Assistant Examiner*—Raquel Alvarez
(74) *Attorney, Agent, or Firm*—Sughrue Mion, PLLC

(57) ABSTRACT

An online commodity management system in which processing for authorization is executed, when a request for purchase is made from a client to a server system, the request is verified for authorization by a credit authorizing/settling serve, and when the request for purchase is authorized to the purchaser as a result of the authorization, the desired contents and a serial number for identifying the contents and the purchaser are distributed from the server system to the client as a purchaser. With these operations, correlation between contents and the purchaser can be unified for management on the system. Then, when a report on completion of the purchase is transmitted from the client to the server system, the server system executes the processing for accounting with the purchaser.

23 Claims, 18 Drawing Sheets

FIG.6

| CONTENTS NUMBER | CONTENTS DATA | DECODING KEY DATA |
|---|---|---|
| 1 | CD1 | KD1 |
| 2 | CD2 | KD2 |
| 3 | CD3 | KD3 |
| ⋮ | ⋮ | ⋮ |

| CONTENTS NUMBER | SERIAL NUMBER | USER ID | SERVICE INFORMATION |
|---|---|---|---|
| 1 | CD1-1 | AAA | SV1 |
| | CD1-2 | BBB | |
| | CD1-3 | CCC | |
| 2 | CD2-1 | DDD | SV2 |
| | CD2-2 | EEE | |
| ⋮ | ⋮ | ⋮ | ⋮ |

| SERIAL NUMBER | CONTENTS/SERVICE INFORMATION |
|---|---|
| CD1-1 | CD1/SV1 |
| CD3-2 | CD3/SV3 |
| CD5-1 | CD5/SV5 |

| USER ID | ACCOUNTING-LOG |
|---------|----------------|
| AAA | 97/10/ 1 : LA1 |
|  | 97/10/10 : LA2 |
|  | 97/10/15 : LA3 |
| BBB | 97/10/ 1 : LA1 |
|  | 97/10/ 7 : LA2 |
| ⋮ | ⋮ |

208C

ONLINE COMMODITY MANAGEMENT, A SERVER SYSTEM APPLIED IN THE ONLINE COMMODITY MANAGEMENT SYSTEM, TERMINAL EQUIPMENT APPLIED IN THE ONLINE COMMODITY MANAGEMENT SYSTEM, A MANAGING METHOD IN THE ONLINE COMMODITY MANAGEMENT SYSTEM, AND A COMPUTER-READABLE RECORDING MEDIUM WITH A PROGRAM MAKING A COMPUTER EXECUTE THE METHOD RECORDED THEREIN

FIELD OF THE INVENTION

The present invention relates to an online commodity management system for performing a transaction of contents as commodity in an electronic market virtually constructed on a network, a server system applied in the online commodity management system, terminal equipment applied in the online commodity management system, a managing method in the online commodity management system, and a computer-readable recording medium with a program making a computer execute the method recorded therein.

BACKGROUND OF THE INVENTION

Conventionally, digital commodity such as application software has been sold and bought as contents by means of online shopping through an electronic market. This online shopping is based on a system in which a purchaser selects desired contents from various types of contents displayed on a screen of a personal computer and sends a request to purchase the contents to a center, namely to a seller.

When a transaction is carried out for the sale of the contents, the accounting of the transaction is executed in the purchaser's system. With this accounting, a purchases by each user on managed.

However, the conventional online shopping system is an electronic market provided for the purpose of selling of the contents, and for this reason additional services such as provision of information for upgrading of the sold contents or information of other contents produced by a manufacturer of the contents have not been sufficient yet.

SUMMARY OF THE INVENTION

It is an object of the present invention to provide an online commodity management system which can efficiently provide services or the like after a transaction of contents is made, a server system applied in the online commodity management system, terminal equipment applied in the online commodity management system, an accounting method in the online commodity management system, and a computer-readable recording medium with a program making a computer execute the method recorded therein.

With the present invention, when selling contents, a server system transmits data containing a serial number for identifying the contents and their purchaser thereof added to the contents which a terminal equipment makes a request for the purchase thereof to the terminal equipment, and at the same time manages a correlation between the contents and the purchaser using the serial number, so that a serial number for identifying contents and a purchaser thereof can be shared on the system at a timing of transmitting the contents as a reference, and for this reason service operations or the like after a transaction of contents can efficiently be provided.

With the present invention, when the account processing is executed for sale of contents from a server system to the terminal equipment through the network, the server system transmits a serial number for identifying the contents purchased by the terminal equipment as well as the purchaser to the terminal equipment, and at the same time manages a correlation between the contents and the purchaser with the serial number, so that a serial number for identifying contents and a purchaser thereof can be shared on the system at a timing of accounting as a reference, and for this reason service operations or the like after a transaction of commodity can efficiently be executed.

With the present invention, when an inquiry is sent from a terminal equipment to a server system on the contents purchased using the terminal equipment, the terminal equipment transmits data containing a serial number for identifying the contents for which a request for purchase is made to the server system, so that data on the contents can easily be obtained on the system from the contents identified according to the serial number, and for this reason improvement in the aspect of services provided after a transaction of commodity can be achieved.

With the present invention, when service information concerning contents is transmitted from a server system to a terminal equipment, the server system identifies a purchaser from the contents and transmits data containing service information relating to the contents added to the serial number for identifying the contents to the terminal equipment as a purchaser, so that information relating to the contents can easily be identified on the system from the contents identified according to the serial number, and for this reason improvement in the aspect of services provided after a transaction of commodity can be achieved.

With the present invention, in the server system, a serial number for identifying contents and the purchaser is generated for the contents requested from terminal equipment, and the serial number is added to the desired contents and distributed to the terminal equipment, and the desired contents and the serial number sent from the server system are stored in the terminal equipment as well as in the server system, so that a serial number for identifying contents and the purchaser can be shared on the system at a timing of distributing the contents as a reference, and for this reason service operations or the like provided after a transaction of commodity can efficiently be executed.

With the present invention, in the server system, the processing for accounting is executed after the desired contents requested from a terminal equipment is distributed, a serial number for identifying the contents and the purchaser is generated after execution of the processing for accounting, and the serial number is distributed to the terminal equipment, and the desired contents and the serial number sent from the server system are stored in the terminal equipment as well as in the server system, so that a serial number for identifying contents and the purchaser can be shared on the system at a timing of accounting as a reference, and for this reason service operations or the like provided after a transaction of commodity can efficiently be executed.

With the present invention, the server system may manage a correlation among contents, serial numbers and service information with a database.

With the present invention, when an inquiry for desired contents is made from a terminal equipment to the server system, the terminal equipment transmits data containing the serial number for identifying the desired content along with the inquiry to the server system, and the server system fetches service information correlating to the transmitted serial number added to the inquiry from the database and gives a response to the terminal equipment, so that information relating to the contents can easily be identified on the system from the contents identified according to the serial number, and for this reason improvement in the aspect of services provided after a transaction of commodity can be achieved.

With the present invention, when service information concerning contents is transmitted from the server system to a terminal equipment, the server system identifies the purchaser from the contents by referring to the database and transmits data containing the service information relating to the contents added to the serial number for identifying the contents to the terminal equipment as the purchaser, so that information relating to the contents can easily be identified on the system from the contents identified according to the serial number, and for this reason improvement in the aspect of services provided after a transaction of commodity can be achieved.

With the present invention, a serial number for identifying contents and the purchaser corresponding to desired contents is generated in response to a request from a terminal equipment, the serial number is added to the desired contents and distributed to the terminal equipment, and a correlation between the contents and the serial number is managed in the system as well, so that a serial number for identifying contents and the purchaser can be shared with the terminal equipment at a timing of distributing the contents as a reference, and for this reason service operations or the like provided after a transaction of commodity can efficiently be executed.

With the present invention, processing for accounting is executed after contents desired from a terminal equipment is distributed, a serial number for identifying the contents and the purchaser is generated after the processing for accounting, the serial number is distributed to the terminal equipment, and a correlation between the contents and the serial number is managed in the system as well, so that a serial number for identifying contents and the purchaser can be shared with the terminal equipment at a timing of accounting as a reference, and for this reason service operations or the like provided after a transaction of commodity can efficiently be executed.

With the present invention, a correlation among contents, serial numbers and service information may be managed with the data base.

With the present invention, service information corresponding to a transmitted serial number added to the inquiry when it is made is fetched from the database and is transmitted to a terminal equipment, so that information relating to the contents can easily be provided to the terminal equipment from the contents identified according to the serial number sent from the terminal equipment, and for this reason improvement in the aspect of services provided after a transaction of commodity can be achieved.

With the present invention, when service information relating to contents is transmitted to a terminal equipment, a purchaser is identified from the contents by referring to the database, and data containing the service information relating to the contents added to the serial number for identifying the contents to the terminal equipment as the purchaser is transferred, so that information relating to the contents can easily be identified from the contents identified according to the serial number sent from the terminal equipment, and for this reason improvement in the aspect of services provided after a transaction of commodity can be achieved.

With the present invention, when desired contents is requested to the server system in an electronic market constructed on the network and the desired contents is distributed from the server system, the desired contents and a serial number for identifying the contents and the purchaser added to the distributed contents are correlated to each other and stored in the correlated form, so that a serial number for identifying contents and the purchaser can be shared with the server system at a timing of distributing the contents as a reference, and for this reason service operations or the like provided after a transaction of commodity can efficiently be executed.

With the present invention, when desired contents is requested to server system in an electronic market constructed on the network and the desired contents is received from the server system, a specified report for a timing for accounting is transferred to the server system, and then, when a serial number distributed from the server system in correlation to the desired content is received, the desired contents and the received serial number are correlated to each other and are stored in the correlated form, so that a serial number for identifying contents and the purchaser can be shared with the server system at a timing of accounting as a reference, and for this reason service operations or the like provided after a transaction of commodity can efficiently be executed.

With the present invention, when an inquiry for desired contents is made to the server system, data containing the serial number for identifying the desired content added to the inquiry is transmitted to the server system, so that information relating to the contents corresponding to the serial number can be requested from the serial number shared with the server system, and for this reason improvement in the aspect of services provided after a transaction of commodity can be achieved.

With the present invention, there are steps of requesting desired contents from a terminal equipment to a server system in an electronic market constructed on a network, transmitting the desired contents and a serial number for identifying the contents and the purchaser added to the contents distributed from the server to the terminal equipment, and managing the desired contents and the serial number in the terminal equipment as well as in the server system respectively correlated to each other, so that a serial number for identifying contents and the purchaser can be shared on the system at a timing of distributing the contents as a reference, and for this reason service operations or the like provided after a transaction of commodity can efficiently be executed.

With the present invention, there are steps of requesting desired contents from a terminal equipment to a server system in an electronic market constructed on the network, executing processing for accounting in the server system when the terminal equipment receives the desired contents from the server system, transmitting a serial number for identifying the contents and the purchaser corresponding to the desired contents from the server system to the terminal equipment after executing the processing for accounting, and managing the desired contents and the serial number correlated to each other in the terminal equipment as well as in the server system respectively, so that a serial number for identifying contents and the purchaser can be shared on the system at a timing of accounting as a reference, and for this reason service operations or the like provided after a transaction of commodity can efficiently be executed.

With the present invention, there are additional steps of transmitting data containing a serial number for identifying the contents added to an inquiry about the contents from a terminal equipment to a server system, and sending back service information relating to the serial number having been sent to the server system to the terminal equipment, so that information relating to the contents can easily be obtained for the terminal equipment on the system from the contents identified according to the serial number, and for this reason improvement in the aspect of services provided after a transaction of commodity can be achieved.

With the present invention, there is an additional step of identifying a purchaser from the contents according to the managed serial number when service information relating to the contents is transmitted from a server system to a terminal equipment with transmission of data containing service information relating to the contents added to the serial number for identifying the contents to the terminal equipment as the purchaser, so that information relating to the contents can easily be identified from the contents identified according to the serial number on the system, and for this reason improvement in the aspect of services provided after a transaction of commodity can be achieved.

With the present invention, there is provided a recording media which records therein a program making a computer execute the method according to any one of the present inventions, which makes the program machine-readable, and for this reason the operation according to any one of the present invention can be realized by a computer system.

Other objects and features of this invention will become clear from the following description with reference to the accompanying drawings.

BRIEF DESCRIPTION OF THE DRAWINGS

FIG. 6 is a view for explaining a method of managing a correlation between the contents database and a key database according to Embodiment 1;

FIG. 10 is a view for explaining a method of managing the data the server system according to Embodiment 1;

FIG. 11 is a view for explaining a method of managing the data in the client according to Embodiment 1;

FIG. 12 is a view showing an example of a accounting-log database according to Embodiment 1;

DESCRIPTION OF THE PREFERRED EMBODIMENTS

Detailed description is made hereinafter for preferred embodiments of the present invention with reference to the accompanying drawings.

Embodiment 1

Figure 1:
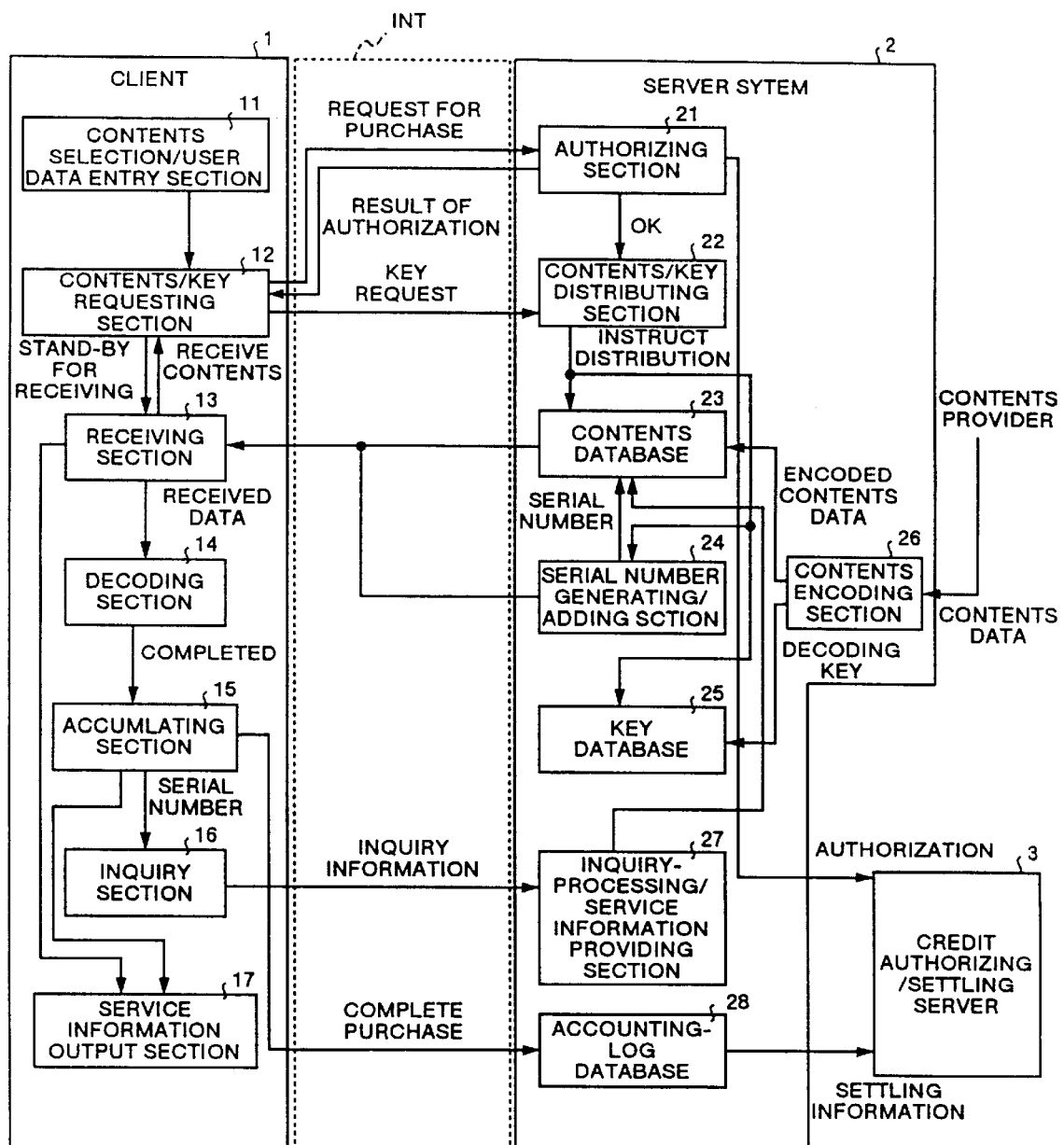
FIG. 1 is a block diagram functionally showing an online commodity management system according to Embodiment 1 of the present invention.

At first, description is made for an online commodity management system according to Embodiment 1 of the present invention from a point of functions thereof. FIG. 1 is a block diagram functionally showing the online commodity management system according to Embodiment 1 of the present invention. This online commodity management system has, as shown in FIG. 1, a client 1 connected to a server system 2 through a network INT such as the Internet or any other commercial communication network through a telephone line so that an online transaction of contents can be realized. The server system 2 is connected to a credit authorizing/settling server 3, via a communication line, that executes the processing for authorization/settlement of a credit to the client 1 as a purchaser.

It should be noted that FIG. 1 shows only the client 1 as a user to make the description simpler and as a representative example of a correlation, because, as far as sale of contents is concerned, a correspondence between a client and a server system is 1 to 1 even if a plurality of clients are connected to the network INT.

In the online commodity management system according to Embodiment 1, a serial number is added to any contents transmitted for selling the contents, this serial number is transmitted together with the contents to the purchaser. Accordingly, management forms for contents on the system in the client 1 as well as in the server system 2 are unified with serial numbers in this online commodity management system.

The client 1 comprises, as shown in FIG. 1, contents selection/user data entry section 11, contents/key requesting section 12, a receiving section 13, a decoding section 14, an accumulating section 15, an inquiry section 16, and a service information outputting section 17. In the the contents selection/user data entry section 11, a user selects desired contents from an electronic market formed on the network INT and enters the user data to request for purchase. The user data indicates herein data such as a credit number required for payment for a purchase with a credit card and a name registered in a credit company.

The contents/key requesting section 12 makes a request for purchase to the server system 2 using the data inputted from the contents selection/user data entry section 11, receives a result of the authorization, and also requests a decoding key for decoding when receiving contents, the contents and the serial number. The receiving section 13 receives the contents data containing the serial number from the server system 2 (contents database 23 described later) and also receives a decoding key corresponding to the contents data. It should be noted that this receiving section 13 also receives information for services such as version-up and some other information relating to the contents. The decoding key may be applied to this service information.

The decoding section 14 decodes the contents and the serial number received by the receiving section 13 using the decoding key. The accumulating section 14 correlates the contents, serial number and service information decoded by the decoding section 14 to each other and stores the data in the correlated form for management. This accumulating section 15 sends a report on completion of the purchase to the server system 2 after the operation for accumulating the data is finished.

The inquiry section 16 transfers, when making an inquiry about service information relating to some of the contents accumulated in the accumulating section 15, information for the inquiry to the server system 2 using a stored serial number correlated to the contents for management. The service information outputting section 17 outputs service information accumulated in the accumulating section 15 or service information received by the receiving section 13 in any of output forms such as displaying or printing.

It should be noted that not only the encryption technology but also the security technology on electronic commerce are applied in communications between the client 1 and the server system 2 although the figure and detailed description thereof are omitted herein. As an example of the security technology, SET (Secure Electronic Transactions) is preferable, but the available technology is not restricted to the SET.

The server system 2 comprises, as shown in FIG. 1, an authorizing section 21, a contents/key distributing section 22, a contents database 23, a serial number generating/adding section 24, a key database 25, a contents encoding section 26, an inquiry-processing/service information providing section 27, and an accounting-log database 28. The authorizing section 21 authorizes a user according to a request for purchase sent from the contents/key requesting section 12 in the client 1. This authorizing section 21 authorizes a credit, when authorizing the user, with a credit authorizing/settling server 3, receives credit authorization therefrom, and returns a result of the credit authorization given therefrom to the contents/key requesting section 12.

The contents/key distributing section 22 instructs, when a request for purchase is authorized by the authorizing section 21 (indicated with OK in the figure), the contents database 23 to distribute the contents and the serial number, and also instructs the key database 25 to distribute a key according to a request for a key from the contents/key requesting section 12. The contents encoding section 26 encodes contents data provided from the contents vendor through a line or the like, outputs the encoded contents to the contents database 23, and outputs data for a decoding key for decoding the contents to the key database 25. This contents encoding section 26 outputs data indicating a correlation between the encoded contents and the decoding key to the contents database 23.

The contents database 23 registers therein encoded contents data supplied from the contents encoding section 26 and also registers therein a correlation between the contents and the decoding key. This contents database 23 also registers therein service information relating to the registered content correlated to each content. Service information is supplied from contents vendors or some other vendors. The contents database 23 distributes specified encoded contents data to the client 1 (receiving section 13) according to an instruction for distribution from the contents/key distributing section 22.

The serial number generating/adding section 24 generates a serial number for the specified encoded contents data and adds the serial number to the specified contents data to be distributed according to the instruction for distribution from the contents/key distributing section 22. The key database 25 registers therein data for decoding keys supplied from the contents encoding section 26. This key database 25 distributes the decoding key correlated to the specified encoded contents data to the client 1 (receiving section 13) according to an instruction for distribution from the contents/key distributing section 22.

The inquiry-processing/service information providing section 27 fetches service information, from the contents database 23, corresponding to the serial number included in the inquiry information transmitted from the inquiry section 16 in the client 1 and provides controls for sending the service information to the receiving section 13 of the client 1. The accounting-log database 28 registers therein accounting data for each purchaser according to a report on completion of purchase transmitted from the accumulating section 14 of the client 1. This accounting-log database 28 transmits accounting data for settling accounts to the credit authorizing/settling server 3 for, for instance, each specified period of time.

Figure 2:
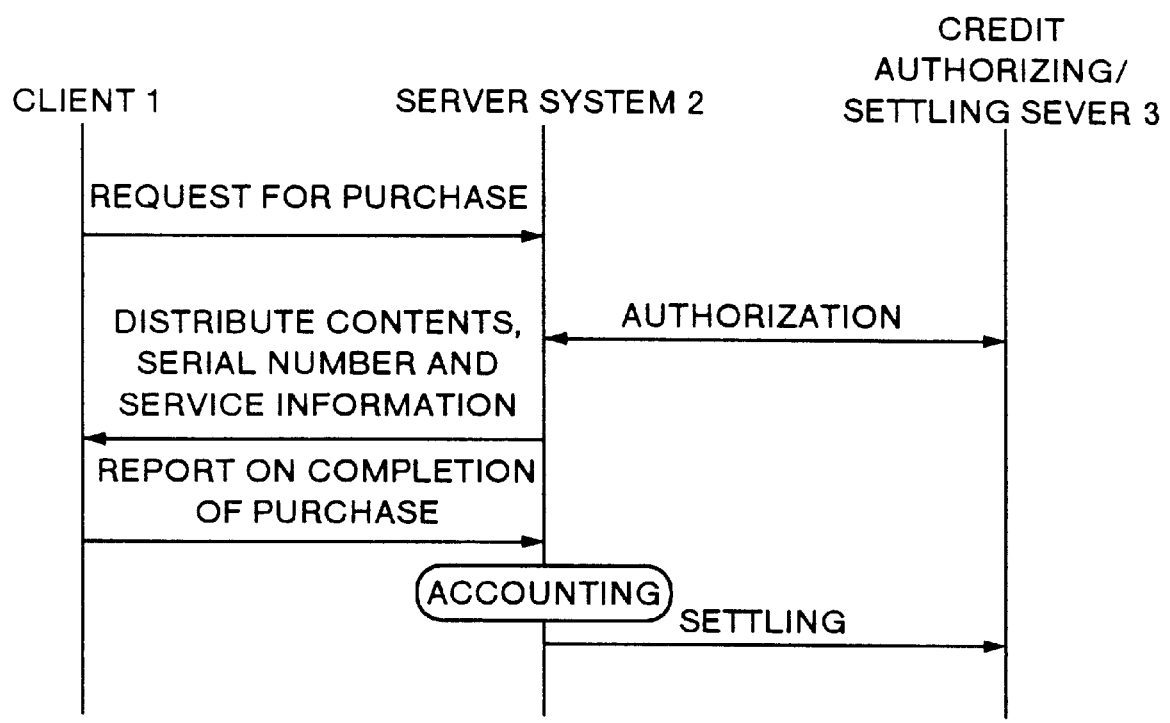
FIG. 2 is a view for explaining an example of the operations of the online commodity management system according to Embodiment 1.

In the next, description is made for the operational sequence. FIG. 2 is a view for explaining an example of the operations in the online commodity management system according to Embodiment 1. In the online commodity management system, when the client 1 makes a request for purchase to the server system 2, the processing for authorization is executed between the server system 2 and the credit authorizing/settling server 3. When the request for purchase is authorized to the purchaser as a result of the authorization, the desired contents are distributed from the server system 2 to the client 1 as a purchaser. When the contents are distributed, a serial number correlated to the contents is generated and added to the contents. When service information relating to the contents has also been registered, the service information is also added to the contents and distributed.

Then, when the client 1 transfers a report on completion of purchase to the server system 2, the server system 2 executes the processing for accounting with the purchaser, and processing for settlement of accounts therewith is executed between the server system 2 and the credit authorizing/settling server 3 after a specified period of time. As described above, a system sharing a serial number for identifying contents and the purchaser on the system is constructed at a timing of distributing the contents as a reference.

Figure 3:
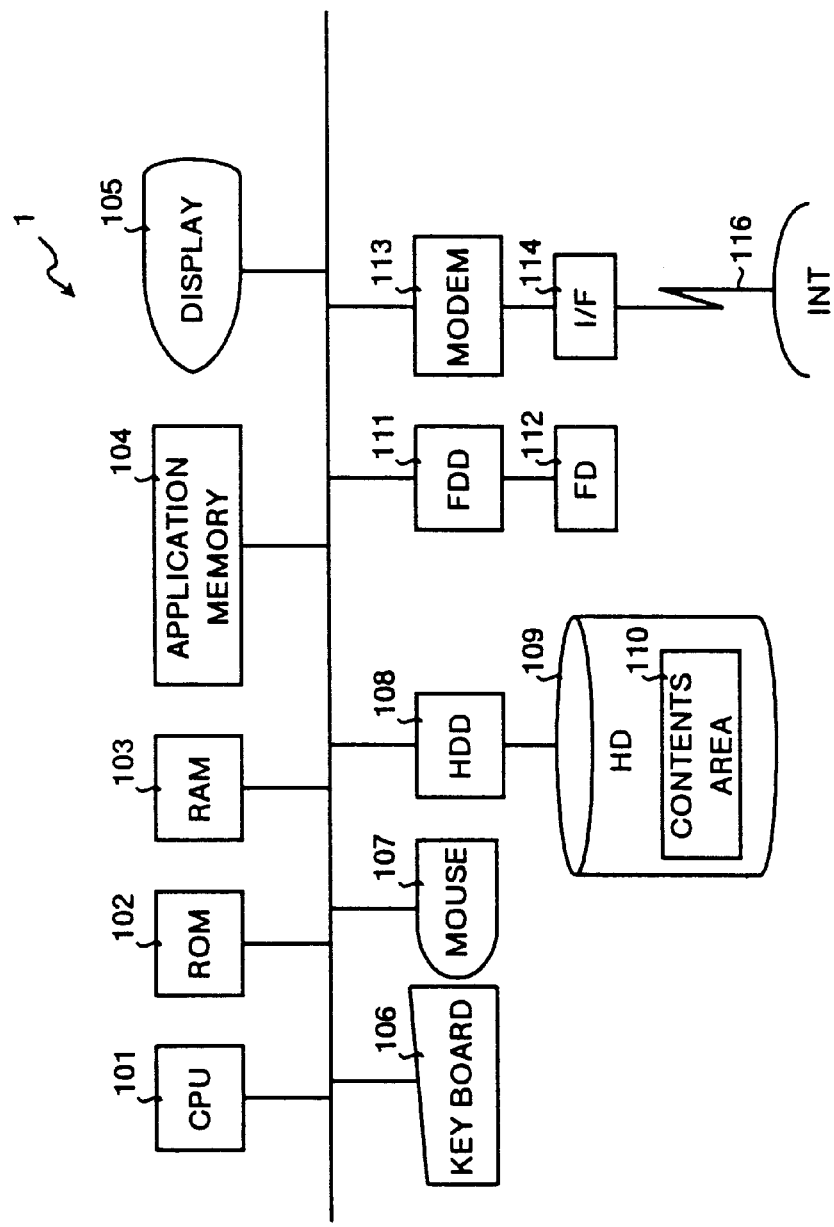
FIG. 3 is a block diagram showing hardware of a client in the online commodity management system according to Embodiment 1.

In the next, description is made for hardware configuration for realizing the functions as described above. At first description is made for the client 1. FIG. 3 is a block diagram showing hardware of the client 1 in the online commodity management system according to Embodiment 1. This client 1 comprises, units such as a CPU 101, a ROM 102, a RAM 103, an application memory 104, a display 105, a keyboard 106, a mouse 107, a hard disk drive (HDD) 108, a hard disk (HD) 109, a floppy disk drive (FDD) 111, a floppy disk (FD) 112, a modem 113, and an interface (I/F) 114, and the units are connected to each other through a bus.

The CPU 101 provides controls over operations of the entire client 1 with various types of program stored in the ROM 102 and the application memory 104. This CPU 101 provides controls over the functions shown in FIG. 1, namely, an entry operation of the contents selection/user data entry section 11, a purchase-requesting operation by the contents/key requesting section 12, a receiving operation by the receiving section 13, a decoding operation by the decoding section 14, an accumulating operation to the accumulating section 15, an inquiry operation by the inquiry section 16, and an outputting operation by the service information outputting section 17 or the like.

The ROM 102 stores therein programs such as an operating system (OS) required for operating the CPU 101. The RAM 103 is used as a work area for the CPU 101. The application memory 104 stores therein an application program for executing the operation for a transaction of contents according to Embodiment 2 (refer to FIG. 7 described later).

The display 105 provides a display screen for displaying the contents and a menu for selection of contents. The keyboard 106 has keys for entry of characters, and the mouse 107 is a tool for pointing at any target on the displayed screen. The HDD 108 provides controls over reading/writing data from/in the HD 109 according to controls by CPU 101. The HD 109 corresponds to the accumulating section 15 and stores (accumulates) therein data written under the control by the HDD 108. Insured in the HD 109 is 9 contents area 110 for accumulating therein contents, serial numbers, and the service information.

The FDD 111 provides controls over reading/writing data from/in the FD 112 according to controls by the CPU 101. The FD 112 corresponds to the accumulating section 15 and stores (accumulates) therein data written under controls by the FDD 111. The modem 113 is connected to the network INT via the I/F 114 and performs modulation or demodulation for communications. The I/F 114 is connected to the network INT via a communication line 116 and works as an interface between the network INT and the internal section of the system.

Figure 4:
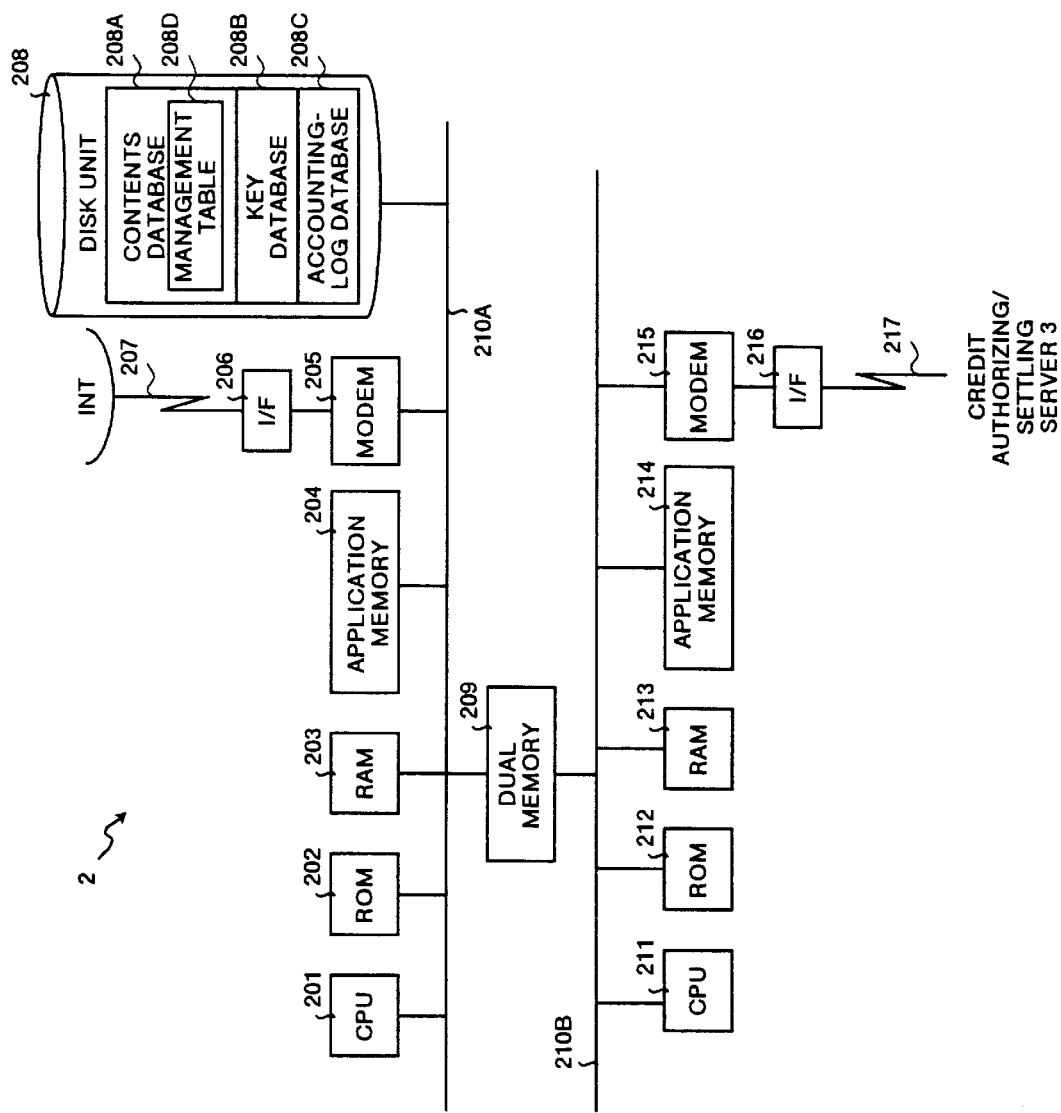
FIG. 4 is block diagram showing hardware of a server system in the online commodity management system according to Embodiment 1.

In the next, description is made for the server system 2. FIG. 4 is a block diagram showing hardware of the server system 2 in the online accounting system according to Embodiment 1. This server system 2 is divided, into sections for executing the processing on the side of network INT and for executing the processing with the credit authorizing/settling server 3.

The section that executes the processing on the side of network INT in the system comprises units such as a CPU 201, a ROM 202, a RAM 203, an application memory 204, a modem 205, an I/F 206, and a disk unit 208, and the units are connected to a bus 210A. The section that executes processing in the credit authorizing/settling server 3 in the system comprises units such as a CPU 211, a ROM 212, a RAM 213, an application memory 214, a modem 215, and an I/F 216, and the units are connected to a bus 210B. In addition, the buses 210A and 210B are connected to each other through a dual memory 209 so that the buses can reciprocally communicate to each other.

At first, in the network INT side section, the CPU 201 provides controls over operations of the entire server system 2 correlating to the client 1 with various types of programs stored in the ROM 202 and the application memory 204. This CPU 201 provides controls over the functions shown in FIG. 1, namely, authorizing operation by the authorizing section 21, distributing operation by the contents/key distributing section 22, operations by the serial number generating/adding section 24, encoding operation by the contents encoding section 26, and operations by the inquiry-processing/service information providing section 27 or the like.

The ROM 202 stores therein programs such as an operating system (OS) required to operate the CPU 201 in the network INT. The RAM 203 is used as a work area for the CPU 201. The application memory 204 stores therein an application program for executing the operation for transactions of contents according to Embodiment 2 (refer to FIG. 7 described later).

The disk unit 208 stores a contents database 208A corresponding to the contents database 23, a key database 208B corresponding to the key database 25, and an accounting-log database 208C corresponding to the accounting-log database 28. This disk unit 208 provides controls over reading/writing data from/in the contents database 208A, key database 208B, and accounting-log database 208C according to the controls by the CPU 201. The contents database 208A has a management table 208D. This management table 208D stores therein the contents number, the serial number, the user ID, and the service information each relating to contents in the correlated state.

The modem 205 is connected to the network INT via the I/F 206 and performs modulation or demodulation for communications. The I/F 206 is connected to the network INT via a communication line 207 and works as an interface between the network INT and the internal sections of the system.

Then, in the credit authorizing/settling server 3 side section, the CPU 211 provides controls over operations of the entire server system 2 in relation to operations of the credit authorizing/settling server 3 by various types of program stored in the ROM 212 and the application memory 214. This CPU 211 provides controls over the functions shown in FIG. 1, namely, an authorizing operation by the authorizing section 21, and a settling operation by the accounting-log database 28 (208C) or the like.

The ROM 212 stores therein programs such as an operating system (OS) required for operating the CPU 211 to operate in the side of credit authorizing/settling server 3. The RAM 213 is used as a work area for the CPU 211. The application memory 214 stores therein an application program for executing the operations for authorization/settlement of accounts according to Embodiment 1 (refer to FIG. 7 described later).

The modem 215 is connected to the credit authorizing/settling server 3 via the I/F 216 and performs modulation or demodulation for communications. The I/F 216 is connected to the credit authorizing/settling server 3 via a communication line 217 and works as an interface between the credit authorizing/settling server 3 and the internal section of the system.

Figure 5:
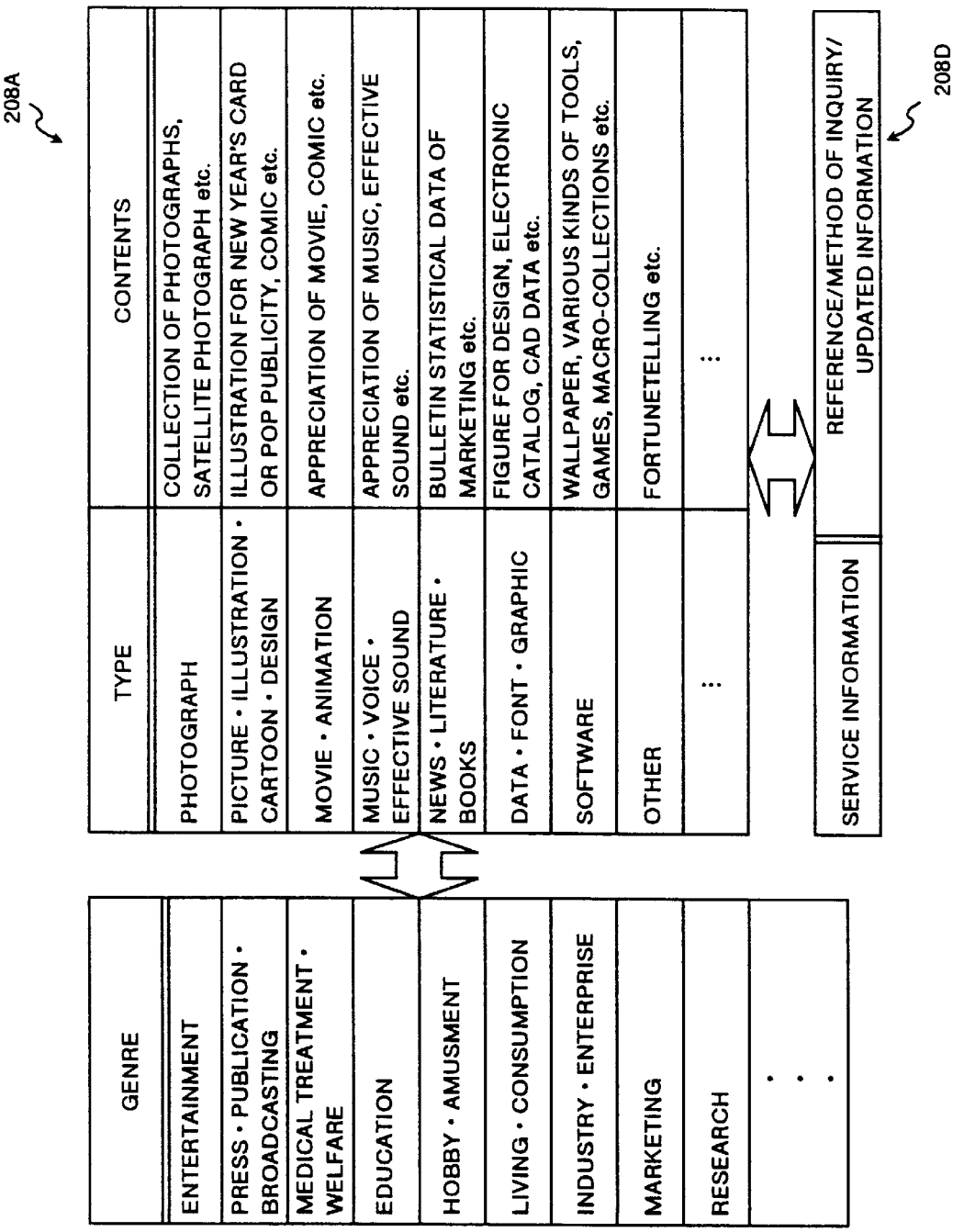
FIG. 5 is a view for explaining contents of a contents database according to Embodiment 1.

In the next, description is made for the contents database 208A. FIG. 5 is a view for explaining the contents database 208A. This contents database 208A comprises of contents data (encoded data) provided by the contents vendors. To describe more specifically, contents are classified, as shown in FIG. 5, into different genre, and a type of contents is commonly correlated to each genre. Contents data in each genre is stored in the database correlated to the types of contents.

Provided in the contents database 208A is the management table 208D. Service information correlated to each contents in this management table 208D includes, as shown in FIG. 5, information of the vendors, a method of making an inquiry, and updated information for a new version or the like.

In the next, description is made for a relation between the contents database 208A and the key database 208B. FIG. 6 is a view for explaining a method of managing a correlation between the contents database 208A and the key database 208B according to Embodiment 1. In FIG. 6, the reference numerals CD1, CD2, CD3 . . . indicate encoded contents data respectively, and the reference numerals KD1, KD2, KD3 . . . indicate data for decoding key respectively.

Allocated to each of contents in the server system 2 is a number for management of the contents, and a correlation between contents and a decoding key is managed with the number. More specifically, when numbers are managed, for instance, based on a system of 1, 2, 3 . . . , as shown in FIG. 6, content No. 1 is allocated to a correlation between content data CD1 and decoding key data KD1, content No. 2 is correlated to content data CD2 as well as to decoding key data KD2, and further content No. 3 is correlated to content data CD3 as well as to decoding key data KD3. When the contents No. 1 is requested for purchase, for example, the encoded content data CD1 and the decoding key data KD1 are distributed to the client 1.

Figure 7:
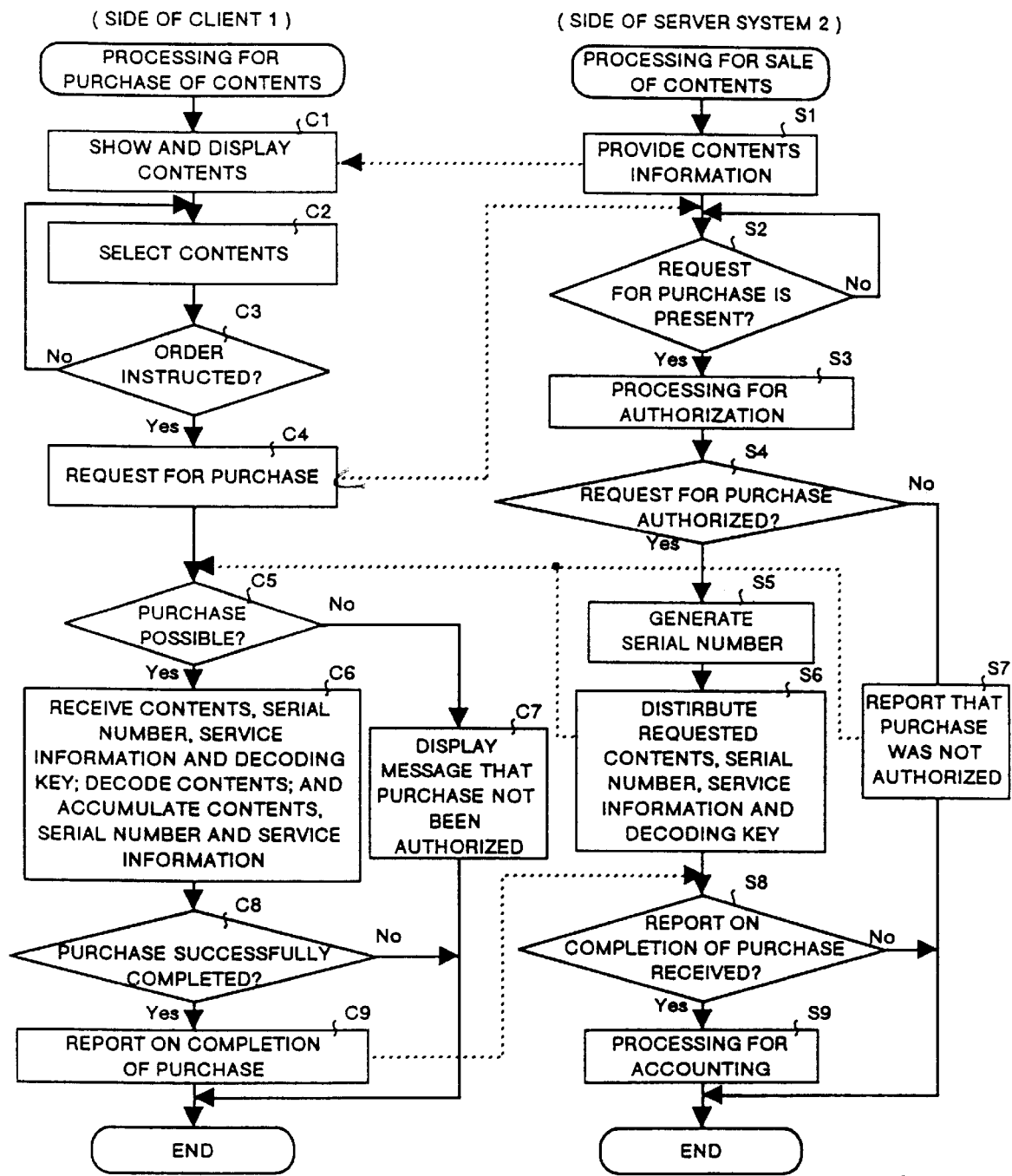
FIG. 7 is a flow chart for explaining operations according to Embodiment 1.

In the next, description is made for operations involved in the online shopping. FIG. 7 is a flow chart for explaining operations according to Embodiment 1, FIG. 8 and FIG. 9 are views each for explaining how a screen is changed along execution of the processing for online shopping, FIG. 10 is a view for explaining a data managing method in the server system, FIG. 11 is a view for explaining a data managing method in the client, and FIG. 12 is a view showing an example of an accounting-log database 208C.

FIG. 7 shows operations for a transaction of commodity between the client 1 and the server system 2. The server system 2 forms a virtual electronic market with digital contents on the network INT. When the electronic market is formed, and if the client 1 accesses the electronic market through the network INT (step S1), contents information is provided from the server system 2 to the client 1. The electronic market can be displayed on the display 105 of the client 1 according to the contents information. When displayed, the electronic market shows various types of contents thereon (step C1).

Figure 8A:
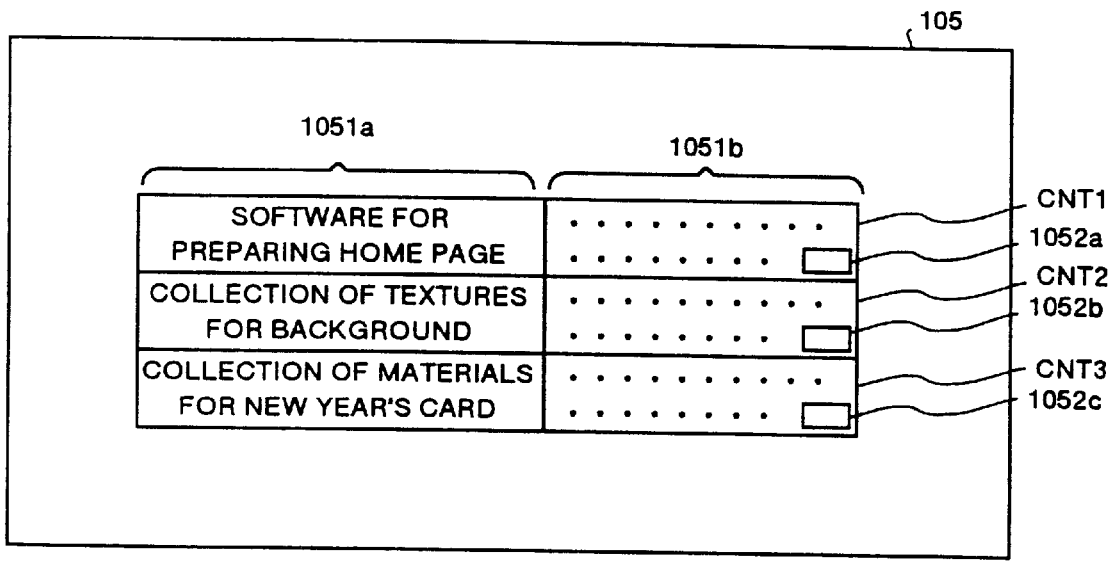
FIGS. 8A and 8B are views for explaining how a screen is changed during execution of operations for online shopping according to Embodiment 1.

FIG. 8A shows a display example of the electronic market on the display 105. A title column 1051a and the contents column 1051b are displayed on the display 105 correlated to each other. Each row in the contents column 1051b has each of check boxes 1052a, 1052b, and 1052c respectively used for selection of contents that a user desires to purchase or for cancellation of the purchase provided therein. Herein three contents CNT1, CNT2, and CNT3 appear thereon, and each of the check boxes 1052a, 1052b, and 1052c are correlated to each of the contents.

For example, when the check box 1052a in the contents CNT1 is checked (selected) (step C2) and an order is instructed by operating the keyboard 106 and mouse 107 (step C3), the selected contents data and user data are transmitted to the server system 2. Before this transmission, entry of the user data is needed.

Figure 8B:
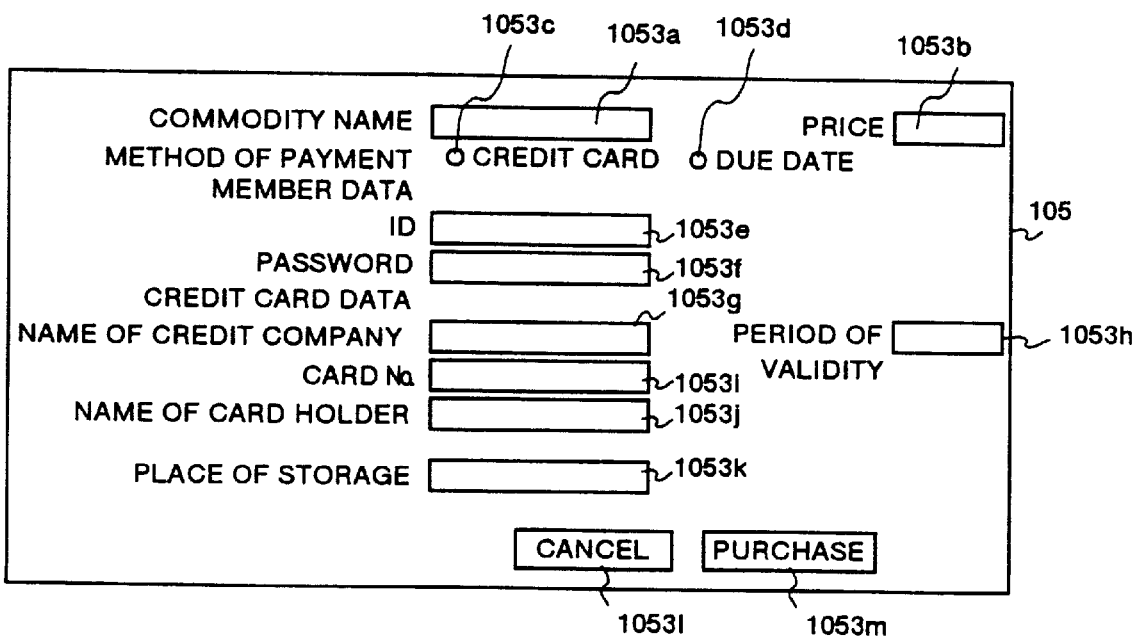

FIG. 8B shows a screen for user-data entry. On the display 105 appear, for entering user data, a screen for entry of user data containing a display box 1053a for a commodity name to be purchased; a display box 1053b for displaying the price for the commodity; a click box 1053c for clicking thereon if the payment is to be made using a credit card and a click box 1053d for clicking thereon for a due date of a bank as one of methods of payment to be selected; a dialog box 1053e for entry of a user ID as well as a dialog box 1053f for entry of a password as member data; a dialog box 1053g for entry of the name of the credit company, a dialog box 1053h for entry of the period of validity of the card, a dialog box 1053i for entry of a card number, and a dialog box 1053j for entry of the name of a card holder each as credit card data; and also a dialog box 1053k for specifying a file to store the data therein to a disk.

Further, a cancel icon 1053l for canceling the entry operations of the user data and a purchase icon 1053m for instructing to send the request for purchase according to the entered user data appear in the lower part of the screen. When the user enters the requirements onto the user-data entry screen and clicks on the purchase icon 1053m to request the purchase (step C4), a standby state is effected for waiting for a result of authorization.

The server system 2 executes, when having received the request for purchase from the client 1 (step S2), the processing for authorization according to the user data sent with the purchase request (step S3). When a request for the purchase is authorized as a result of the authorization (step S4), the contents selected by the user through the client 1 is read out from the contents database 208A and distributed thereto via the network INT. When the contents is distributed, the management table 208D in the contents database 208A is referred to, a serial number correlating to the contents requested for purchase is generated anew according to the current serial number, and the serial number is added to the contents (step S5).

Further, when service information that has already been correlated to the contents requested for purchase is stored in the management table 208D, the service information is also added to the contents. Then, in association with this distribution, a request for a key is also transmitted, so that data for the decoding key correlating to the contents to be currently distributed is read out from the key database 208B according to the key request also by referring to the management table 208D. As described above, the contents requested for purchase and the additional information (serial number, service information and a decoding key) are successively distributed (step S6).

After the requested content and the additional information are distributed to the client 1 as described above, a standby state is effected for waiting for arrival of a report that the processing for purchase is complete. Also when the request for purchase is not authorized as a result of the authorization in step S3 (step S4), a report that the purchase was not authorized is transferred to the client 1, and then this transaction is terminated (step S7).

When the contents is distributed from the server system 2 to the client 1 as described above, contents of the management table 208D is as shown in FIG. 10. Namely, assuming that any number (a mark may be used) is assigned to each of contents and a serial number is generated to each of the contents respectively, as shown in FIG. 10, the serial number and the user ID (address may also be used) for identifying a purchaser are stored therein for management correlated to each other for each content number. Service information is also stored therein being correlated to each contents number.

In the example shown in FIG. 10, service information SV1 as well as three serial numbers CD1-1, CD1-2, and CD1-3 are correlated to contents No. 1 for management. User IDs of AAA, BBB, and CCC are correlated to the serial numbers CD1-1, CD1-2, and CD1-3 respectively. Also, service information SV2 as well as two serial numbers CD2-1 and CD2-2 are correlated to contents No. 2 for management. User IDs of DDD and EEE are correlated to the serial numbers CD2-1 and CD2-2 respectively. Similar correlation is made to contents No. 3 and on, but the figure and the description thereof are omitted herein.

Assuming that the current purchaser has a user ID of AAA, the management table 208D shows that the contents with content No. 1 is purchased and that the serial number for the contents is CD1-1. As there is service information SV1 relating to the contents with content No. 1, the service information is added to the contents for distribution.

Figure 9A:
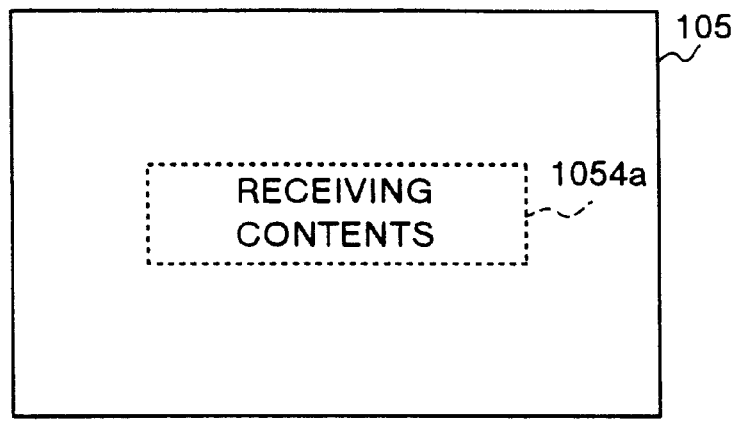
FIGS. 9A to 9C are views for explaining how the screen is changed during execution of operations for online shopping according to Embodiment 1.
Figure 9B:
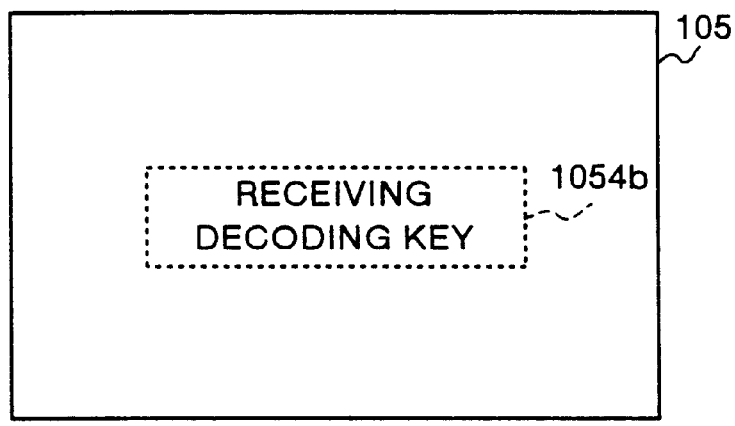

When a request for purchase is authorized by the server system 2 and the requested contents and the additive information are transmitted (step C5), the client 1 receives and decodes the contents and then executes the operation for accumulating the data in the contents area 110 of the HD 109 (step C6). Then, if an operation for receiving the contents is being executed, as shown in FIG. 9A, a message 1054a like "Receiving contents" appears on the display 105. If an operation for receiving the decoding key is being executed, as shown in FIG. 9B, a message 1054b like "Receiving decoding key" appears on the display 105. On the other hand, when a report that the purchase was not authorized (step C5) is received, a message indicating that the purchase has not been authorized appears on the display 105 (step C7), and this transaction is terminated.

Figure 9C:
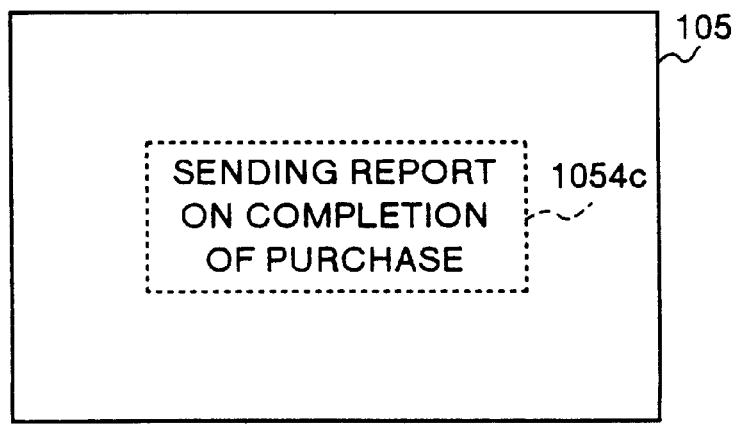

When operations for receiving, decoding and accumulating of the contents are finished in step C6, determination is made as to whether the operations for purchasing the contents has successfully been completed or not (step C8). When it is determined that purchase of the contents has successfully been made (step C8), the client 1 sends a report on completion of the purchase to the server system 2 (step C9). In this case, as shown in FIG. 9C, a message 1054c like "Sending report on completion of purchase" appears on the display 105. Also when it is determined that the operation for purchasing the contents could not successfully be completed due to incapability of communications or decoding fault or for some other reason (step C8), this transaction is regarded as invalid and terminated.

When the purchased contents is accumulated in the HD 109 as described above, as shown in FIG. 11, the contents and the service information are correlated to the serial number and stored in the correlated state. In other words, both of the contents and service information are managed with the serial number. For example, when the user (user ID of AAA) of the client 1 has purchased three contents data CD1, CD3, and CD5, the contents data CD1 with the service information SV1, CD3 with SV3, and CD5 with SV5 are correlated to the serial numbers CD1-1, CD3-2, CD5-1 respectively and stored in the correlated state for management.

The server system 2 executes, when receiving a report that the purchase has been completed (step S8), the processing for accounting with the purchaser based on the recognition that successful purchase of the contents has been made by the client 1 as a purchaser (step S9). The data obtained through this accounting processing is managed as shown in FIG. 12. Namely, in a case of a user having a user ID of AAA as the client 1 in the accounting-log database 208C shown in FIG. 12, the account data LA1, LA2, and LA3 are logged on Oct. 1, 10 and 15, 1997, respectively. Also, in a case of a user name of BBB as other client, the account data LB1 and LB2 are logged on Oct. 1 and 7, 1997, respectively.

On the other hand, when the report on completion of the purchase is not received (step S8), the processing is terminated without executing the processing for accounting with the purchaser. It should be noted that the processing for accounting may be programmed to wait until the report on completion of the purchase is received unless the delay prevents the smooth operation of the system.

Figure 13:
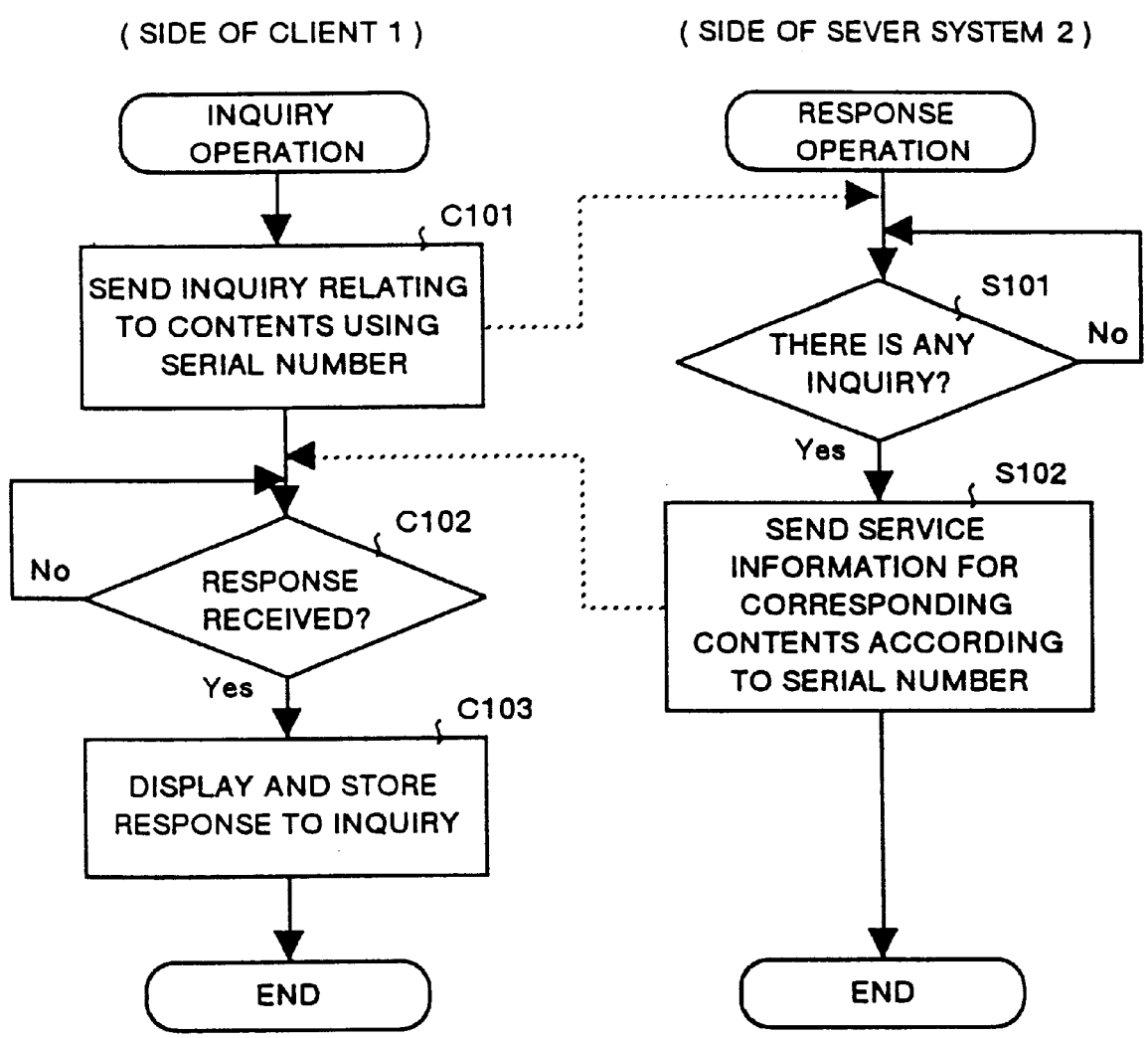
FIG. 13 is a flow chart for explaining operations for an inquiry according to Embodiment 1.

In the next, description is made for operations of inquiring. FIG. 13 is a flow chart for explaining operations relating to an inquiry according to Embodiment 1, and FIG. 14 are views for explaining how the screen is changed along the operations for making the inquiry.

Figure 14A:
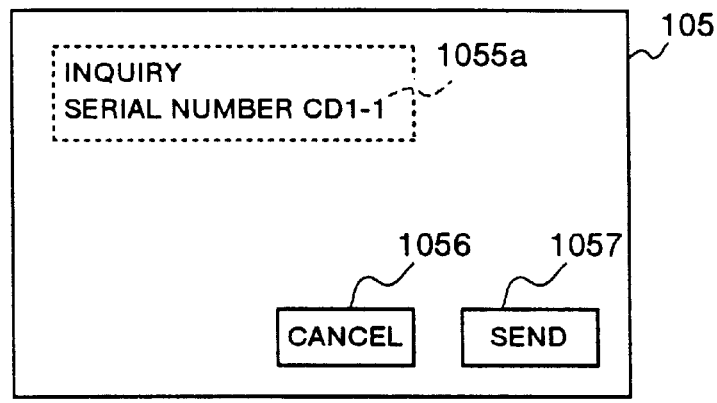
FIGS. 14 to 14C are views for explaining how the screen is changed during execution of operations for making the inquiry in Embodiment 1.

When an inquiry relating to the purchased content is to be made from the client 1 to the server system 2, the serial number added to the purchased content is used. Accordingly, the client 1 can specify the contents on which an inquiry is to be requested on the display 105 using the serial number. For example, required data 1055a relating to the contents on which an inquiry is desired appears in a window on the screen as shown in FIG. 14A. A cancel icon 1056 and a send icon 1057 also appear on the screen.

Figure 14B:
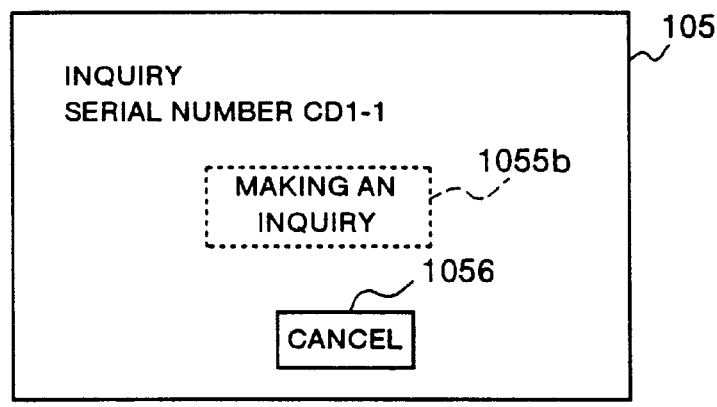

When the cancel icon 1056 is selected here, this inquiry is canceled, and when the send icon 1057 is selected, the inquiry relating to the above data 1055a is sent (step C101). Then, as shown in FIG. 14B, the send icon 1057 disappears, but a message 1055b indicating "Making an inquiry" appears instead.

Then, a standby state of waiting for arrival of the response to the inquiry sent in step C101 is effected. It should be noted that only a series of flows are described in the flow chart shown in FIG. 13 by correlating the inquiry operation to the response operation. Practically, the series of flows are executed through mail transactions, so that it is assumed that the client does not have to wait for arrival of the response after the inquiry is made.

The server system 2 verifies, when receiving an inquiry from the client 1 (step S101), the serial number added to the inquiry to the management table 208D, and executes the processing for sending back thereto service information as a response stored with the serial number correlating thereto (step S102).

Figure 14C:
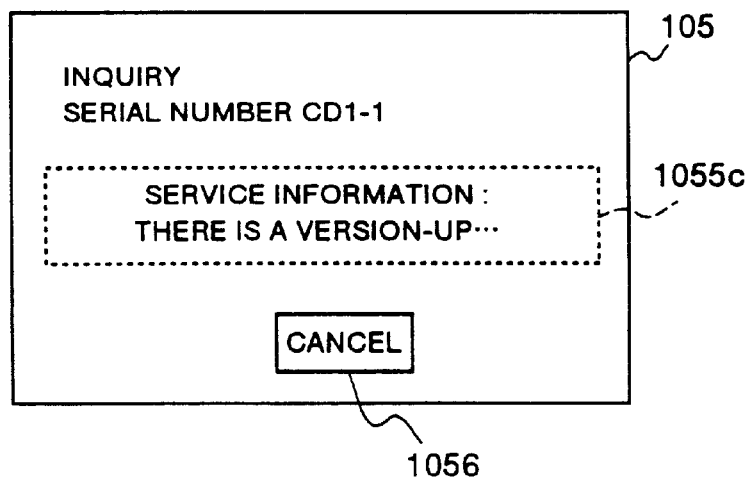

When the response is sent to the client 1 as described above, the client 1 receives the response (step C102). The service information as a response to the inquiry is displayed on the display 105 and is stored in the HD 109. A responded message 1055c indicating "Service information: There is a version-up" appears thereon as an example of response as shown in FIG. 14C.

Figure 15:
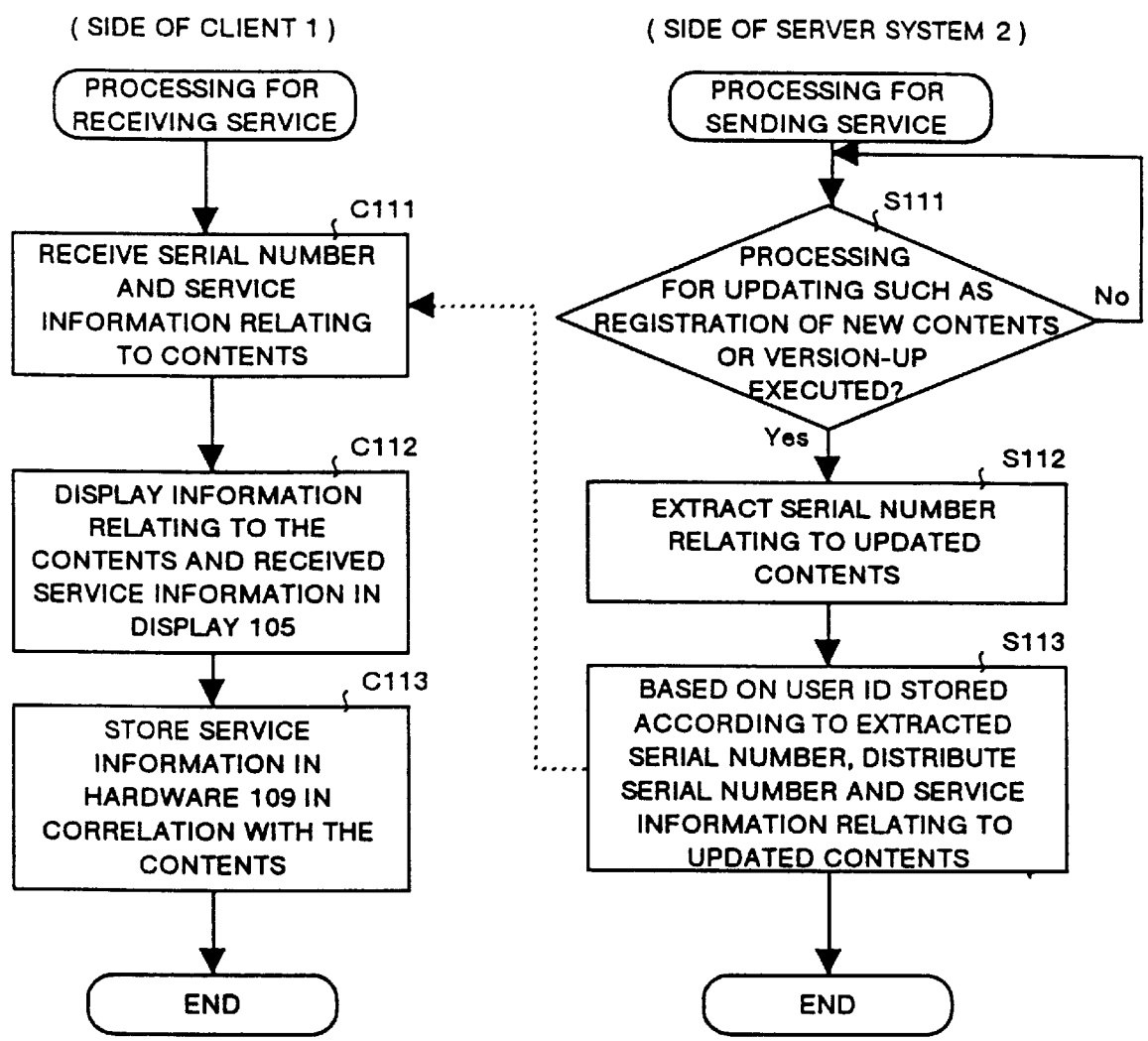
FIG. 15 is a flow chart for explaining operations for distribution of services according to Embodiment 1.
Figure 16:
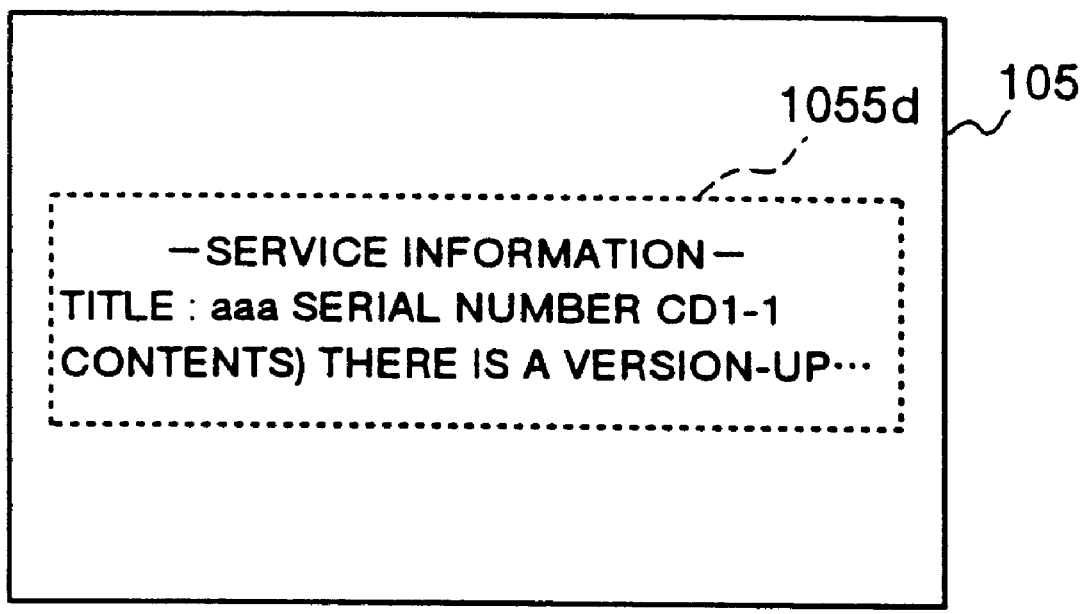
FIG. 16 is a view for explaining how the screen is changed during the operations for distributing services in Embodiment 1.

Conversely, service information can also be distributed from the server system 2 to the client 1. In the next, description is made for operations for distribution of services. FIG. 15 is a flow chart for explaining operations relating to distribution of services according to Embodiment 1, and FIG. 16 is one of views for explaining how the screen is changed along the operations for distributing services.

In this distribution service, updating of the management table 208D stored in the contents database 208A becomes a trigger in the server system 2. Accordingly, when processing for updating such as registration of a new content or version-up is executed in the server system 2 (step S111), the serial number relating to the updated content is extracted from the management table 208D (step S112).

Then, when the related serial number can be extracted from the management table 208D, the serial number and the service information relating to the updated contents are distributed to the client 1 according to a user ID stored in correlation to the serial number (step S113).

With the operations described above, the client 1 receives the serial number and the service information relating to the updated content transmitted from the server system 2 (step C111), and data such as the title as well as the serial number and service information relating to the received content appear on the display 105 (step C112). For example, if a title of the contents is "aaa" and a serial No. is CD1-1, as shown in FIG. 16, the title: aaa, serial No.: CD1-1 and the contents of the service information appear in a display box 1055d for service information on the display 105. Those displayed contents are stored in the contents area 110 of the HD 109 in the storage form shown in FIG. 11 (step C113).

As described above, with Embodiment 1, a serial number for identifying contents and the purchaser is shared on the system at a timing of distributing the contents, so that the service operations or the like provided after a transaction of commodity can efficiently be executed.

The server system 2 manages a correlation among the contents, serial number and service information with a database, which makes it possible to realize online commodity management in which operational efficiency is improved.

Information relating to any contents can easily be obtained from the contents identified by the serial number on the system, so that improvement in the aspect of services provided after a transaction of commodity can be achieved.

Also, information relating to any contents can easily be identified from the contents identified by the serial number on the system, so that improvement in the aspect of services provided after a transaction of commodity can be achieved.

Embodiment 2

In Embodiment 1, a serial number is transmitted together with contents according to a request for purchase from a client, but like in Embodiment 2 described below, a serial number may be transmitted to a client after accounting is executed for transacted contents.

Figure 17:
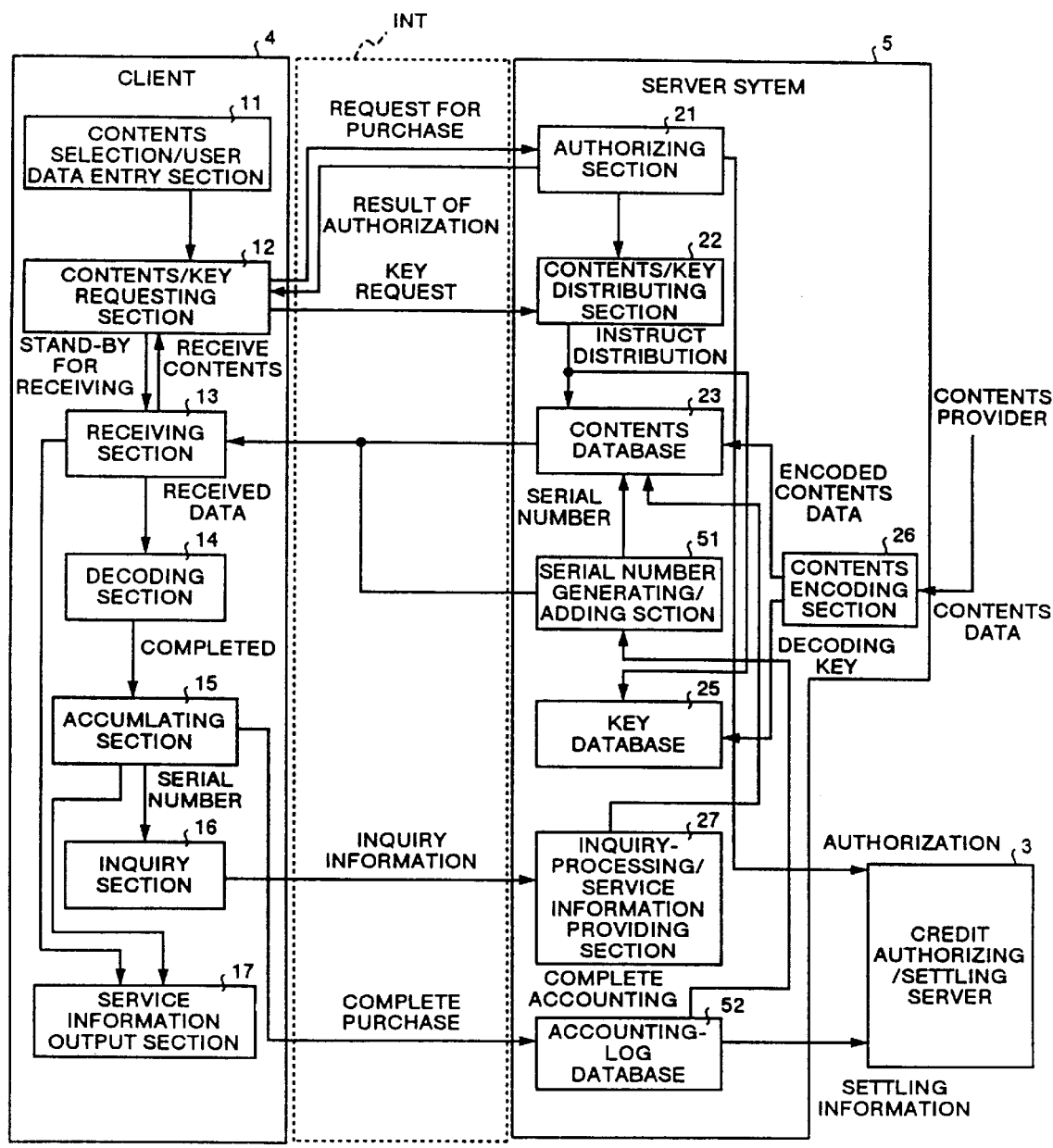
FIG. 17 is a block diagram functionally showing an online commodity management system according to Embodiment 2 of the present invention.

At first, description is made for an online commodity management system according to Embodiment 2 from a functional point of view. FIG. 17 is a block diagram functionally showing the online commodity management system according to Embodiment 2 of the present invention. This online commodity management system has, as shown in FIG. 17, a client 4 connected to a server system 5 through the same network INT as that in Embodiment 1 so that an online transaction of contents can be realized. The server system 5 is connected to the same credit authorizing/settling server 3 as that in Embodiment 1 via a communication line, that executes processing for authorization/settlement to the client 4 as a purchaser to/from the credit authorizing/settling server 3 and settling accounts with the purchaser therewith through the online system.

It should be noted that FIG. 17 shows only the client 4 as a user to make description simpler and as a representative example of a correlation that is made, as far as sale of the contents is concerned, a correspondence between a client and a server system 5 is 1 to 1 even if a plurality of clients are connected to the network INT.

As for internal configuration of the client 4 as well as of the server system 5, the identical names and identical reference numerals are assigned to the sections identical to those in Embodiment 1, and detailed description thereof is omitted herein.

The client 4 has the same configuration as that in Embodiment 1 as shown in FIG. 1. Namely, the client 4 comprises the contents selection/user data entry section 11, contents/key requesting section 12, receiving section 13, decoding section 14, accumulating section 15, inquiry section 16, and service information outputting section 17.

Also, the server system 5 comprises, as shown in FIG. 17, the authorizing section 21, content/key distributing section 22, contents database 23, a serial number generating section 51, key database 25, contents encoding section 26, inquiry-processing/service information providing section 27, and an accounting-log database 52. This server system 5 has the serial number generating section 51 provided therein in place of the serial number generating/adding section 24 according to Embodiment 1, and also has the accounting-log database 52 provided therein in place of the accounting-log database 28 according to Embodiment 1.

The serial number generating section 51 generates a serial number for identifying the contents data encoded when completion of the processing for accounting in the accounting-log database 52 is reported therefrom, and distributes the generated serial number. In Embodiment 1, the serial number generating/adding section 24 distributes the contents and also transmits the serial number, but in Embodiment 2, a serial number for contents as an object for accounting is distributed after accounting is executed.

The accounting-log database 52 registers therein account data for each purchaser according to a report on completion of purchase transmitted from the accumulating section 15 of the client 4 and also sends a report on completion of accounting to the serial number generating section 51. This accounting-log database 52 transmits account data for settling accounts to the credit authorizing/settling server 3 for, for instance, each specified period of time.

Figure 18:
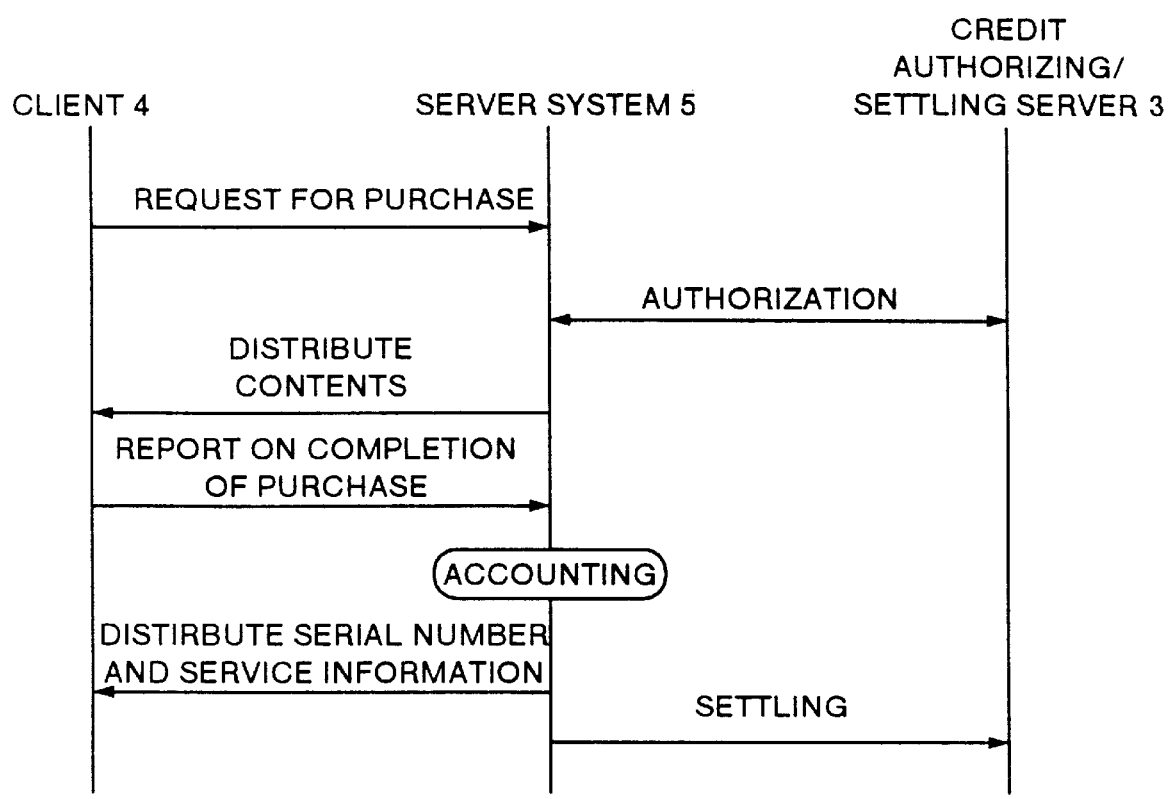
FIG. 18 is a view for explaining an example of the operations of the online commodity management system according to Embodiment 2.

In the next, description is made for an operational sequence. FIG. 18 is a view for explaining an example of the operations in the online commodity management system according to Embodiment 2. In the online commodity management system described above, when the client 4 makes a request for purchase to the server system 5, the processing for authorization is executed between the sever system 5 and the credit authorizing/settling server 3 by authorizing the request for purchase. When the request for purchase is authorized to the purchaser as a result of the authorization, the desired contents and the decoding key are distributed from the server system 5 to the client 4 as a purchaser.

Then, when the client 4 transfers a report on completion of purchase to the server system 5, the server system 5 executes the processing for accounting with the purchaser, and a serial number to the contents is generated at the above timing and the serial number is distributed to the client 4. In distribution thereof, if service information relating to the contents has also been registered, the service information is added to the serial number and also distributed. Furthermore, settlement of accounts is executed between the server system 5 and the credit authorizing/settling server 3 after a specified period of time. As described above, a system sharing a serial number for identifying contents and the purchaser on the system is constructed at a timing of accounting as a reference.

Figure 19:
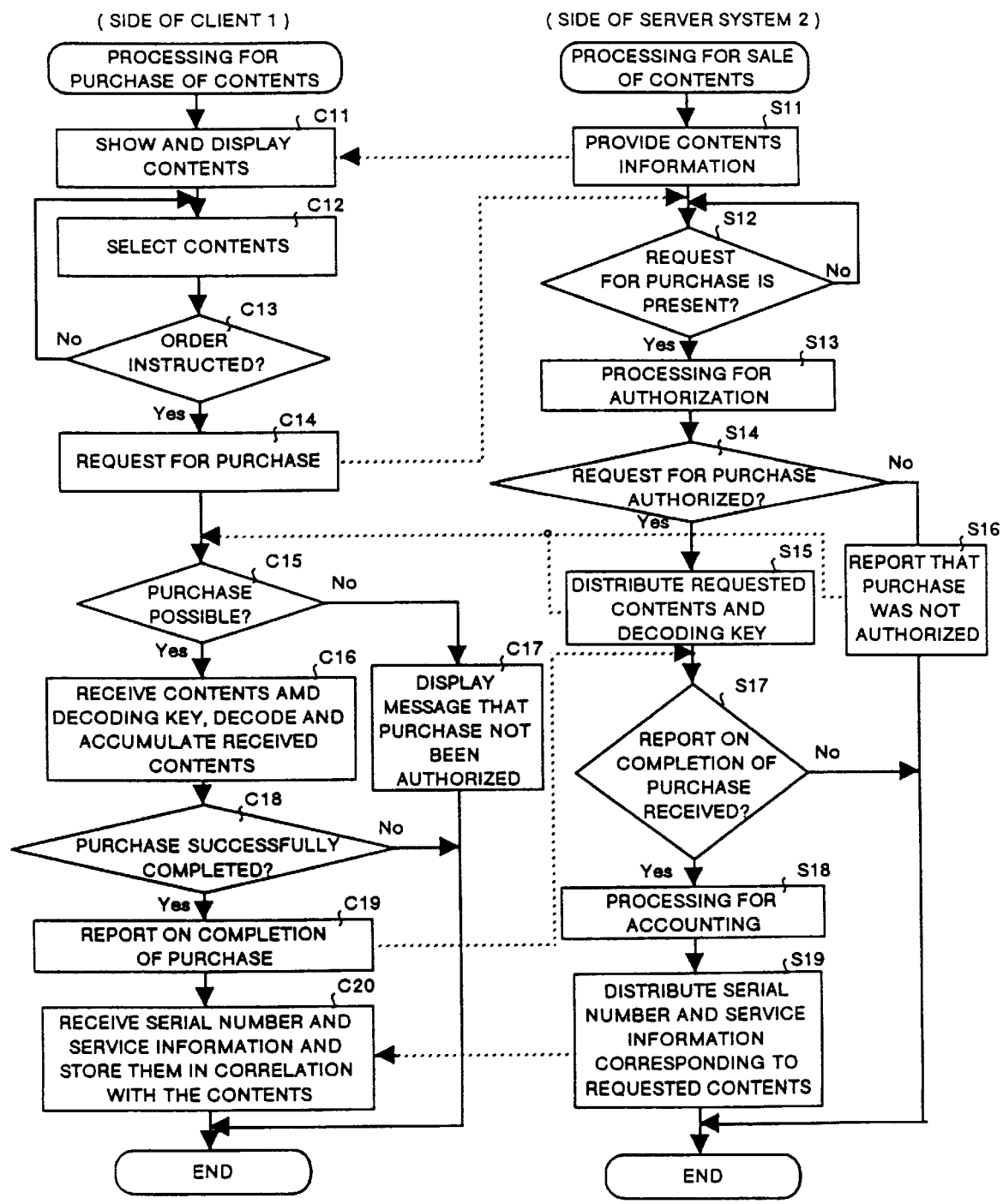
FIG. 19 is a flow chart for explaining operations according to Embodiment 2.

In the next, description is made for operations involved in the online shopping in Embodiment 2. FIG. 19 is a flow chart for explaining operations in Embodiment 2. FIG. 19 shows operations for a transaction of commodity between the client 4 and the server system 5. The server system 5 forms a virtual electronic market with digital contents to the network INT. When the electronic market is formed, and if the client 4 accesses the electronic market through the network INT, contents data is provided from the server system 5 to the client 4 (step S11). The electronic market can be displayed on the display 105 of the client 4 according to the contents data. When displayed, the electronic market shows various types of contents thereon (step C11).

Then, like in Embodiment 1, when contents is selected (step C12) and an order is instructed by operating the keyboard 106 and mouse 107 (step C13), the selected contents data and user data are transmitted to the server system 2. Before this transmission, entry of the user data is needed. When the user enters the requirements onto the user-data entry screen and makes a request for purchase (step C14), a standby state for waiting for a result of authorization is effected.

The server system 5 executes, when having received a request for purchase from the client 4 (step S12), the processing for authorization according to the user data sent with the purchase request (step S13). When the request for purchase is authorized as a result of the authorization (step S14), the contents selected by the user through the client 4 is read out from the contents database 208A. At this point of time, as a key is requested from the client 4, decoding key data correlating to the contents that is to be currently distributed is read out, by referring to the management table 208D, from the key database 208B according to the key request. As described above, the contents requested for purchase and the decoding key are distributed (step S16).

After the requested content and the decoding key are distributed to the client 4 as described above, a standby state for waiting for arrival of a report that the processing for purchase is complete is effected. Also when the request for purchase is not authorized as a result of the authorization in step S13 (step S14), the report that the purchase was not authorized is transferred to the client 4, and then this transaction is terminated (step S16).

When the request for purchase is authorized to the client 4 from the server system 5 and the requested contents and the decoding key are transmitted thereto (step C15), the client 4 receives the contents and executes operations for decoding the received content and accumulating it in the contents area 110 of the HD 109 (step C16). When the report that the request for purchase was not authorized is sent to the client 4 (step C15), a message indicating that the purchase was not authorized appears on the display 105 (step C17), and this transaction is terminated.

When the operations for receiving, decoding and accumulating the contents are finished in step C16, determination is made as to whether the operation for purchasing the contents has successfully been completed or not (step C18). When it is determined that the purchase has successfully been made (step C18), the client 4 sends a report that the purchase has been completed to the server system 5 (step C19). Also when it is determined that the operation for purchasing the contents could not successfully be completed due to incapability of communications or decoding fault or for some other reasons (step C18), this transaction is terminated on the recognition that there was no transaction.

The server system 5 executes, when having received the report on completion of the purchase (step S17), the processing for accounting with the purchaser based on the recognition that purchase of the contents has successfully been made by the client 4 as a purchaser like in Embodiment 1 (step S18). On the other hand, when the report that the purchase has been completed is not received (step S17), the processing for accounting with the purchaser is not executed and the processing is terminated. It should be noted that the processing for accounting may be programmed to wait until the report on completion of the purchase is received provided that the delay does not prevent the smooth operation of the system.

Then, in the server system 5, a serial number correlated to the purchased contents is generated and the serial number is registered in the management table 208D. With these operations, like in Embodiment 1, the serial number, user ID, and service information are correlated to the serial number of the purchased contents and stored in the correlated state in the manage table 208D for management. In Embodiment 2, after the processing for accounting is executed, the serial number and service information are distributed to the client 4 (step S19).

In the client 4, as described above, the serial number and service information correlated to the contents having been purchased are correlated to the received content and accumulated for management (step C20). The same management system as that in Embodiment 1 can be constructed in this stage in the client 4.

As described above, with Embodiment 2, in addition to the same effects as those in Embodiment 1, a serial number for identifying contents and the purchaser is shared on the system at a timing of accounting as a reference, so that service operations or the like provided after a transaction of commodity can efficiently be executed.

It should be noted that, in Embodiment 2 like in Embodiment 1, it is also possible to make an inquiry from the client 4 and also to distribute services from the server system 5.

With this invention, when selling contents, a server system transmits, data containing a serial number for identifying the contents and their purchaser added to the contents which a terminal equipment makes a request for the purchase to the terminal equipment, and at the same time manages a correlation between the contents and the purchaser using the serial number, so that a serial number for identifying contents and a purchaser thereof can be shared on the system at a timing of transmitting the contents as a reference; whereby there is provided the effect that it is possible to obtain an online commodity management system which can efficiently provide services or the like after a transaction of commodity.

With this invention, when the account processing is executed for sale of contents from a server system to the terminal equipment through the network, the server system transmits a serial number for identifying the contents purchased by the terminal equipment as well as the purchaser to the terminal equipment, and at the same time manages a correlation between the contents and the purchaser with the serial number, so that a serial number for identifying contents and a purchaser thereof can be shared on the system at a timing of accounting as a reference; whereby there is provided the effect that it is possible to provide an online commodity management system which can efficiently provide services or the like after a transaction of commodity.

With this invention, when an inquiry is sent from a terminal equipment to a server system on the contents purchased using the terminal equipment, the terminal equipment transmits data containing a serial number for identifying the purchased contents being inquired to the server system, so that data on the contents can easily be obtained on the system from the contents identified according to the serial number; whereby there is provided the effect that it is possible to provide an online commodity management system which allows improvements in services after a transaction of commodity.

With this invention, when service information concerning contents is transmitted from a server system to a terminal equipment, the server system identifies a purchaser from the contents and transmits data containing service information relating to the contents added to the serial number for identifying the contents to the terminal equipment as a purchaser, so that information relating to the contents can easily be identified on the system from the contents identified according to the serial number; whereby there is provided the effect that it is possible to provide an online commodity management system which allows improvement in services after a transaction of commodity.

With this invention, in the server system, a serial number for identifying contents and the purchaser is generated for the contents requested from terminal equipment, and the serial number is added to the desired contents and distributed to the terminal equipment, and the desired contents and the serial number sent from the server system are stored in the terminal equipment as well as in the server system, so that a serial number for identifying contents and the purchaser can be shared on the system at a timing of distributing the contents as a reference; whereby there is provided the effect that it is possible to provide an online commodity management system which can efficiently provide services or the like after a transaction of commodity.

With this invention, in the server system, the processing for accounting is executed after the desired contents requested from a terminal equipment is distributed, a serial number for identifying the contents and the purchaser is generated after execution of the processing for accounting, and the serial number is distributed to the terminal equipment, and the desired contents and the serial number sent from the server system are stored in the terminal equipment as well as in the server system, so that a serial number for identifying contents and the purchaser can be shared on the system at a timing of accounting as a reference; whereby there is provided the effect that it is possible to provide an online commodity management system which can efficiently provide services or the like after a transaction of commodity.

With this invention, the server system manages a correlation among contents, serial numbers and service information with a database; whereby there is provided the effect that it is possible to provide an online commodity management system with higher performance.

With this invention, when an inquiry for desired contents is made from a terminal equipment to the server system, the terminal equipment transmits data containing the serial number for identifying the desired content along with the inquiry to the server system, and the server system fetches service information correlating to the transmitted serial number added to the inquiry from the database and gives a response to the terminal equipment, so that information relating to the contents can easily be identified on the system from the contents identified according to the serial number; whereby there is provided the effect that it is possible to provide an online commodity management system which allows improvement in services after a transaction of commodity.

With this invention, when service information concerning contents is transmitted from the server system to a terminal equipment, the server system identifies the purchaser from the contents by referring to the database and transmits data containing the service information relating to the contents added to the serial number for identifying the contents to the terminal equipment as the purchaser, so that information relating to the contents can easily be identified on the system from the contents identified according to the serial number; whereby there is provided the effect that it is possible to provide an online commodity system which allows improvement in services after a transaction of commodity.

With this invention, a serial number for identifying contents and the purchaser corresponding to desired contents is generated in response to a request from a terminal equipment, the serial number is added to the desired contents and distributed to the terminal equipment, and a correlation between the contents and the serial number is managed in the system as well, so that a serial number for identifying contents and the purchaser can be shared with the terminal equipment at a timing of distributing the contents as a reference; whereby there is provided the effect that it is possible to provide a server system for an online commodity management system which can efficiently provide services or the like after a transaction of commodity.

With this invention, processing for accounting is executed after contents desired from a terminal equipment is distributed, a serial number for identifying the contents and the purchaser is generated after the processing for accounting, the serial number is distributed to the terminal equipment, and a correlation between the contents and the serial number is managed in the system as well, so that a serial number for identifying contents and the purchaser can be shared with the terminal equipment at a timing of accounting as a reference; whereby there is provided the effect that it is possible to provide a server system for an online commodity management system which can effectively provide services or the like after a transaction of commodity.

With this invention, a correlation among contents, serial numbers and service information is managed with the data base; whereby there is provided the effect that it is possible to provide a serve system for an online commodity management system which has higher performance.

With this invention, service information corresponding to a transmitted serial number added to the inquiry when it is made is fetched from the database and is transmitted to a terminal equipment, so that information relating to the contents can easily be provided to the terminal equipment from the contents identified according to the serial number sent from the terminal equipment; whereby there is provided the effect that it is possible to provide a server system for an online commodity system which allows improvement in services after a transaction of commodity.

With this invention, when service information relating to contents is transmitted to a terminal equipment, a purchaser is identified from the contents by referring to the database, and data containing the service information relating to the contents added to the serial number for identifying the contents to the terminal equipment as the purchaser is transferred, so that information relating to the contents can easily be identified from the contents identified according to the serial number sent from the terminal equipment; whereby there is provided the effect that it is possible to provide a server system for an online commodity management system which allows improvement in services after a transaction of commodity.

With this invention, when desired contents is requested to the server system in an electronic market constructed on the network and the desired contents is distributed from the server system, the desired contents and a serial number for identifying the contents and the purchaser added to the distributed contents are correlated to each other and stored in the correlated form, so that a serial number for identifying contents and the purchaser can be shared with the server system at a timing of distributing the contents as a reference; whereby there is provided the effect that it is possible to provide a terminal equipment for an online commodity management system which can efficiently provide services or the like after a transaction of commodity.

With this invention, when desired contents is requested to server system in an electronic market constructed on the network and the desired contents is received from the server system, a specified report for a timing for accounting is transferred to the server system, and then, when a serial number distributed from the server system in correlation to the desired content is received, the desired contents and the received serial number are correlated to each other and are stored in the correlated form, so that a serial number for identifying contents and the purchaser can be shared with the server system at a timing of accounting as a reference; whereby there is provided the effect that it is possible to provide a terminal equipment for an online commodity management system which can efficiently provide services or the like after a transaction of commodity.

With this invention, when an inquiry for desired contents is made to the server system, data containing the serial number for identifying the desired content added to the inquiry is transmitted to the server system, so that information relating to the contents corresponding to the serial number can be requested from the serial number shared with the server system; whereby there is provided the effect that it is possible to provide a server system for an online commodity management system which allows improvement in services after a transaction of commodity.

With this invention, there are steps of requesting desired contents from a terminal equipment to a server system in an electronic market constructed on a network, transmitting the desired contents and a serial number for identifying the contents and the purchaser added to the contents distributed from the server to the terminal equipment, and managing the desired contents and the serial number in the terminal equipment as well as in the server system respectively correlated to each other, so that a serial number for identifying contents and the purchaser can be shared on the system at a timing of distributing the contents as a reference; whereby there is provided the effect that it is possible to provide a terminal equipment for an online commodity management system which can efficiently provide services or the like after a transaction of commodity.

With this invention, there are steps of requesting desired contents from a terminal equipment to a server system in an electronic market constructed on the network, executing processing for accounting in the server system when the terminal equipment receives the desired contents from the server system, transmitting a serial number for identifying the contents and the purchaser corresponding to the desired contents from the server system to the terminal equipment after executing the processing for accounting, and managing the desired contents and the serial number correlated to each other in the terminal equipment as well as in the server system respectively, so that a serial number for identifying contents and the purchaser can be shared on the system at a timing of accounting as a reference; whereby there is provided the effect that it is possible to provide a terminal equipment for an online commodity management system which can efficiently provide services or the like after a transaction of commodity.

With this invention, there are additional steps of transmitting data containing a serial number for identifying the contents added to an inquiry about the contents from a terminal equipment to a server system, and sending back service information relating to the serial number having been sent to the server system to the terminal equipment, so that information relating to the contents can easily be obtained for the terminal equipment on the system from the contents identified according to the serial number; whereby there is provided the effect that it is possible to provide a terminal equipment for an online commodity management system which allows improvement in services after a transaction of commodity.

With this invention, there is further a step of identifying a purchaser from the contents according to the managed serial number when service information relating to the contents is transmitted from a server system to a terminal equipment with transmission of data containing service information relating to the contents added to the serial number for identifying the contents to the terminal equipment as the purchaser, so that information relating to the contents can easily be identified from the contents identified according to the serial number on the system; whereby there is provided the effect that it is possible to provide a terminal equipment for an online commodity management system which allows improvement in services after a transaction of commodity.

With this invention, there is provided a recording media

What is claimed is:

1. An online commodity management system comprising:
   a server system connected to a network for virtually constructing an electronic market formed with a plurality of contents on said network and providing controls for selling the contents and accounting for sold contents through said electronic market; and
   at least one terminal equipment connected to said network for getting access to said electronic market and providing controls for purchasing the contents; wherein
   said terminal equipment comprising:
      a requesting unit for requesting desired contents to said server system in said electronic market constructed on said network;
      a receiver for receiving said desired contents distributed from said server system upon the request by said requesting unit and a serial number, added to said contents and distributed, for identifying the contents and purchaser; and
      a storage for storing therein the desired contents and the serial number received by said receiver; and
   said server system comprising:
      a serial number generator for generating said serial number correlating to said desired contents upon the request from said requesting unit;
      a managing unit for managing a correlation between the serial number generated by said serial number generator and the contents; and
      a distributing unit for distributing to said terminal equipment data obtained by adding the serial number generated by said serial number generator to said desired contents requested by said requesting unit.

2. An online commodity management system according to claim 1; wherein said server system has a database for managing a correlation among contents, serial numbers and service information.

3. An online commodity management system according to claim 2; wherein said terminal equipment transmits, when making an inquiry about said desired contents to said server system, data containing said serial number for identifying said desired contents added to the inquiry to said server system, and said server system fetches service information correlating to said transmitted serial number added to the inquiry from said database and gives a response to said terminal equipment.

4. An online commodity management system according to claim 2; wherein said server system identifies when sending service information relating on contents to said terminal equipment, a purchaser from said contents by referring to said database and transmits data containing the service information relating to said contents added to the serial number for identifying said content to the terminal equipment as said purchaser.

5. An online commodity management system according to claim 3; wherein said server system identifies, when sending service information relating on contents to said terminal equipment, a purchaser from said contents by referring to said database and transmits data containing the service information relating to said contents added to the serial number for identifying said content to the terminal equipment as said purchaser.

6. An online commodity management system comprising:
a server system connected to a network for virtually constructing an electronic market formed with a plurality of contents on said network and providing controls for selling the contents and accounting for sold contents based on an encoding system through said electronic market; and
at least one terminal equipment connected to said network for accessing to said electronic market and providing controls for purchasing the contents that require decoding thereof; wherein
said terminal equipment comprising:
a requesting unit for requesting desired contents to said server system in said electronic market constructed on said network;
a reporting unit for transmitting, when having received said desired contents by means of distribution from said server system upon the request by said requesting unit, a specified report to said server system; and
a storage for storing therein, when a serial number for identifying said desired contents and purchaser distributed correlated to the contents received from said server system is received after said specified report is transmitted by said reporting unit, said received desired contents and said serial number correlated to each other; and
said server system comprising:
a contents distributing unit for distributing said desired contents requested by said requesting unit in said terminal equipment thereto;
an accounting unit for executing accounting when said specified report is transmitted by said reporting unit after said desired contents is distributed by said content distributing unit;
a serial number generator for generating said serial number correlating to said desired contents distributed by said content distributing unit after the processing for accounting is executed by said accounting unit;
a managing unit for managing a correlation between the serial number generated by said serial number generator and the contents; and
a serial number distributing unit for distributing the serial number generated by said serial number generator to said terminal equipment.

7. An online commodity management system according to claim 6; wherein said server system has a database for managing a correlation among contents, serial numbers and service information.

8. An online commodity management system according to claim 7; wherein said terminal equipment transmits, when making an inquiry about said desired contents to said server system, data containing said serial number for identifying said desired contents added to the inquiry to said server system, and said server system fetches service information correlating to said transmitted serial number added to the inquiry from said database and gives a response to said terminal equipment.

9. An online commodity management system according to claim 8; wherein said server system identifies, when sending service information relating on contents to said terminal equipment, a purchaser from said contents by referring to said database and transmits data containing the service information relating to said contents added to the serial number for identifying said content to the terminal equipment as said purchaser.

10. An online commodity management system according to claim 7; wherein said server system identifies, when sending service information relating on contents to said terminal equipment, a purchaser from said contents by referring to said database and transmits data containing the service information relating to said contents added to the serial number for identifying said content to the terminal equipment as said purchaser.

11. Terminal equipment for an online commodity management system having:
a server system connected to a network for virtually constructing an electronic market formed with a plurality of contents on said network and providing controls for selling the contents and accounting for sold contents through said as electronic market; and
at least one terminal equipment connected to said network for accessing to said electronic market and providing controls for purchasing the contents; and
said server system comprising:
a unit for generating a serial number for identifying said contents and the purchaser correlating to desired contents upon the request by said terminal equipment and adding said generated serial number to said desired contents to be distributed to said terminal;
said terminal equipment comprising:
a requesting unit for requesting desired contents to said server system in said electronic market constructed on said network;
a receiver for receiving said desired contents and a serial number added to said contents for distribution each distributed from said server system upon the request by said requesting unit; and
a storage for storing therein the desired contents and the serial number received by said receiver correlated to each other.

12. Terminal equipment for the online commodity management system according to claim 11; wherein said online commodity management system is a system, in said server system, for sending back service information as a response corresponding to the serial number added to the inquiry transmitted from said terminal equipment thereto, and said terminal equipment transmits, when making an inquiry about said desired content to said server system, data containing said serial number for identifying said desired contents added to the inquiry to said server system.

13. Terminal equipment for an online commodity management system having:
a server system connected to a network for virtually constructing an electronic market formed with a plurality of electronically deliverable contents on said network and providing controls for selling the contents and accounting for sold contents based on an encoding system through said electronic market; and
at least one terminal equipment connected to said network for accessing to said electronic market and providing controls for purchasing the contents that require decoding thereof; and
said server system comprising:
a unit for executing the processing for accounting after the desired contents requested by said terminal equipment is distributed and distributing a serial number for identifying said contents and the purchaser correlating to said desired contents after the processing for accounting is executed;
said terminal equipment comprising:
a requesting unit for requesting desired contents to said server system in said electronic market constructed on said network;

a reporting unit for transmitting, when having received said desired contents by means of distribution from said server system upon the request by said requesting unit, a specified report to said server system; and a storage for storing therein, when a serial number distributed correlated to said desired contents received from said server system is received after said specified report is transmitted by said reporting unit, said received desired contents and said serial number correlated thereto.

14. Terminal equipment for the online commodity management system according to claim 13; wherein said online commodity management system is a system, in said server system, for sending back service information as a response corresponding to the serial number added to the inquiry transmitted from said terminal equipment thereto, and said terminal equipment transmits, when making an inquiry about said desired content to said server system, data containing said serial number for identifying said desired contents added to the inquiry to said server system.

15. A managing method for an online commodity management system, said system having:

a server system connected to a network for virtually constructing an electronic market formed with a plurality of contents on said network and providing controls for selling the contents and accounting for sold contents based on an encoding system through said electronic market; and at least one terminal equipment connected to said network for getting access to said electronic market and providing controls for purchasing the contents that require decoding thereof;

said managing method comprising:

a first step of requesting desired contents from said terminal to said server system in said electronic market constructed on said network;

a second step of executing processing for accounting in said server system when said terminal receives said desired content from said server system upon the request in said first step;

a third step of transmitting a serial number for identifying said content correlated to said desired contents as well as the purchaser from said server system to said terminal after executing the processing for accounting in said second step; and a fourth step of managing said desired contents and the serial number correlating to each other in each of said terminal and said server system respectively.

16. A managing method for the online commodity management system according to claim 15 further comprising:

a fifth step of transmitting data containing a serial number for identifying said contents added to the inquiry about the contents from said terminal to said server system, and a sixth step of sending back service information as a response on said serial number transmitted in said fifth step to said terminal.

17. A managing method for the online commodity management system according to claim 16 further comprising:

a step of identifying a purchaser from the contents according to said managed serial number when service information relating to the contents is transmitted from said server system to said terminal, and transmitting data containing service information relating to said contents added to said serial number for identifying the contents to the terminal as said purchaser.

18. A managing method for the online commodity management system according to claim 15 further comprising:

a step of identifying a purchaser from the contents according to said managed serial number when service information relating to the contents is transmitted from said server system to said terminal, and transmitting data containing service information relating to said contents added to said serial number for identifying the contents to the terminal as said purchaser.

19. A computer readable recording medium with a program making a computer execute a managing method for an online commodity management system, said system having:

a server system connected to a network for virtually constructing an electronic market formed with a plurality of contents on said network and providing controls for selling the contents and accounting for sold contents based on an encoding system through said electronic market; and at least one terminal equipment connected to said network for getting access to said electronic market and providing controls for purchasing the contents that require decoding thereof:

said managing method comprising:

a first step of requesting desired contents from said terminal to said server system in said electronic market constructed on said network;

a second step of executing processing for accounting in said server system when said terminal receives said desired content from said server system upon the request in said first step;

a third step of transmitting a serial number for identifying said content correlated to said desired contents as well as the purchaser from said server system to said terminal after executing the processing for accounting in said second step; and a fourth step of managing said desired contents and the serial number correlating to each other in each of said terminal and said server system respectively.

20. A computer readable recording medium according to claim 19 with a program for executing a method wherein the method further comprises:

a fifth step of transmitting data containing a serial number for identifying said contents added to the inquiry about the contents from said terminal to said server system, and a sixth step of sending back service information as a response on said serial number transmitted in said fifth step to said terminal.

21. A computer readable recording medium according to claim 19 with a program for executing a method wherein the method further comprises:

a step of identifying a purchaser from the contents according to said managed serial number when service information relating to the contents is transmitted from said server system to said terminal, and transmitting data containing service information relating to said contents added to said serial number for identifying the contents to the terminal as said purchaser.

22. A computer readable recording medium according to claim 21 with a program for executing a method wherein the method further comprises:

a step of identifying a purchaser from the contents according to said managed serial number when service information relating to the contents is transmitted from said server system to said terminal, and transmitting data containing service information relating to said contents added to said serial number for identifying the contents to the terminal as said purchaser.

23. A computer readable recording medium with a program for executing a method making a computer execute a managing method for an online commodity management system, said system having:

a server system connected to a network for virtually constructing an electronic market formed with a plurality of contents on said network and providing controls for selling the contents and accounting for sold contents through said electronic market; and at least one terminal equipment connected to said network for accessing to said electronic market and providing controls for purchasing the contents;

said managing method comprising:

a first step of requesting desired contents from said terminal to said server system in said electronic market constructed on said network;

a second step of transmitting said desired content as well as a serial number for identifying the contents and purchaser added to said contents to be distributed from said server system to said terminal upon the request in said first step;

a third step of managing said desired contents and the serial number correlating to each other in each of said terminal and said server system respectively; and wherein the method further comprises:

a transmitting step of transmitting data containing a serial number for identifying said contents added to the inquiry about the contents from said terminal to said server system, and a sending back step of sending back service information as a response on said serial number transmitted in said transmitting step to said terminal.

* * * * *